United States Patent [19]
Woo

[11] Patent Number: 5,808,582
[45] Date of Patent: Sep. 15, 1998

[54] GLOBAL POSITIONING SYSTEM RECEIVER WITH IMPROVED MULTIPATH SIGNAL REJECTION

[75] Inventor: Richard Kai-Tuen Woo, Orange, Calif.

[73] Assignee: Litton Consulting Group, Inc., Redondo Beach, Calif.

[21] Appl. No.: 795,608

[22] Filed: Feb. 5, 1997

Related U.S. Application Data

[60] Provisional application No. 60/026,023 Sep. 13, 1996.

[51] Int. Cl.$^6$ ....................................................... G01S 5/02
[52] U.S. Cl. ........................................... 342/357; 375/208
[58] Field of Search ................................... 342/357, 352; 455/12.1; 375/208

[56] References Cited

U.S. PATENT DOCUMENTS

| | | | |
|---|---|---|---|
| 4,426,712 | 1/1984 | Gorski-Popiel | 375/96 |
| 4,665,404 | 5/1987 | Christy et al. | 342/463 |
| 4,754,465 | 6/1988 | Trimble | 375/1 |
| 5,101,416 | 3/1992 | Fenton et al. | 375/1 |
| 5,192,957 | 3/1993 | Kennedy | 342/357 |
| 5,225,842 | 7/1993 | Brown et al. | 342/357 |
| 5,323,322 | 6/1994 | Mueller et al. | 364/449 |
| 5,390,124 | 2/1995 | Kyrtsos | 364/449 |
| 5,398,034 | 3/1995 | Spilker | 342/357 |
| 5,402,441 | 3/1995 | Washizu et al. | 375/209 |
| 5,414,729 | 5/1995 | Fenton | 375/209 |
| 5,495,499 | 2/1996 | Fenton et al. | 375/205 |

*Primary Examiner*—Thomas H. Tarcza
*Assistant Examiner*—Dao L. Pham
*Attorney, Agent, or Firm*—Flehr Hohbach Test Albritton & Herbert LLP

[57] ABSTRACT

A global positioning system receiver includes an inbound signal terminal to receive an inbound global positioning system signal having an inbound PRN code from a global positing system signal source. A local PRN code generator is configured to generate a local PRN code. A discriminator is coupled to the inbound signal terminal and to the local PRN code generator and configured to compare the inbound signal and the local PRN code and to generate a discriminator signal containing a positive portion and a negative portion. A processor is coupled to the discriminator and configured to receive the discriminator signal to process the discriminator signal to determine a bit code and to determine a distance from the global positing system signal source based on said bit code. In one embodiment, the discriminator includes an acquisition mode configured to acquire the inbound PRN code wherein the discriminator has a first gate width and a tracking mode configured to track the PRN code wherein the discriminator has a second gate width less than the first gate width. Advantages of the invention include improved multipath signal rejection.

18 Claims, 21 Drawing Sheets

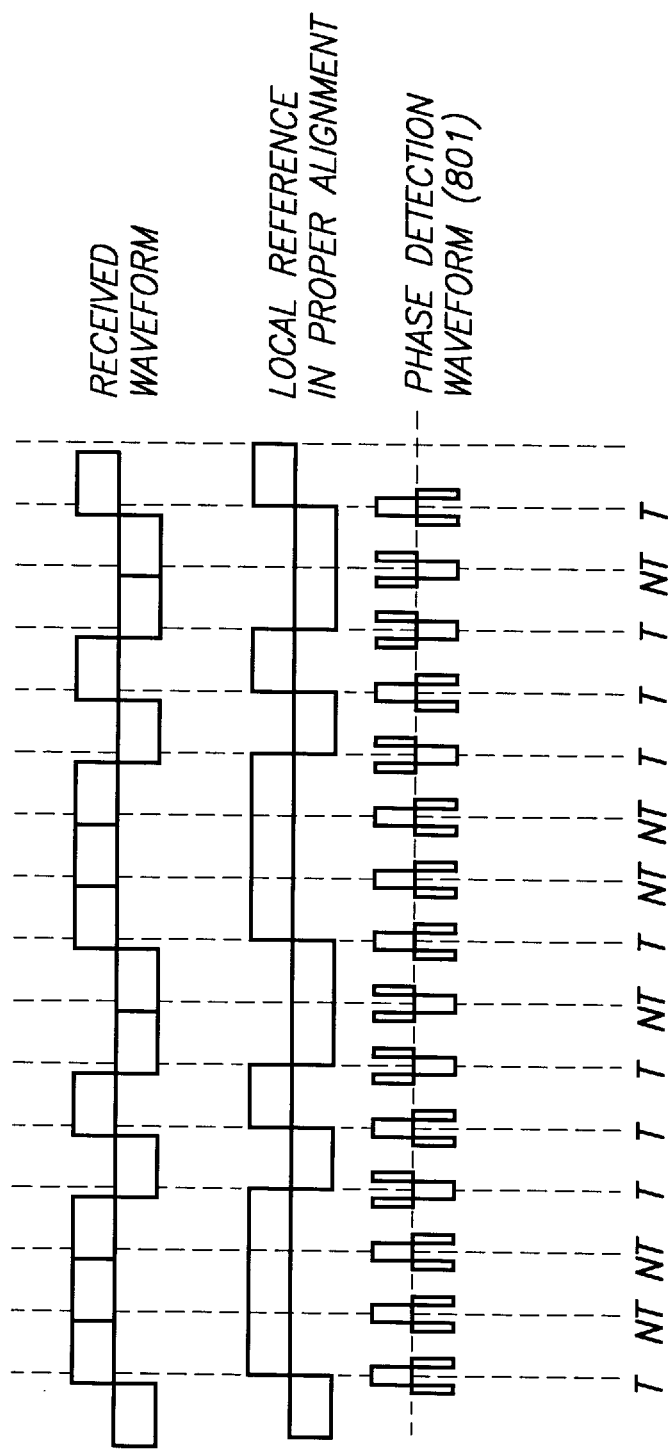

GLOBAL POSITIONING SYSTEM RECEIVER WITH IMPROVED MULTIPATH SIGNAL REJECTION

REFERENCE TO RELATED APPLICATIONS

This application claims priority to U.S. provisional application Ser. No. 60/026,063 filed Sep. 13, 1996.

FIELD

The present invention relates generally to digital PRN code receivers, and in particular, to the generation of code timing error signals used to control the local code time in order to track the received PRN signal without excessive pseudorange error caused by multipath fading.

BACKGROUND

A satellite based radio ranging system allows a user to precisely determine position and time by passively receiving the orbiting satellites' transmission of ranging signals and navigation data consisting essentially of each satellite's ephemeris (i.e., position) and clock (time of the day) information, ionospheric modeling parameters, and other status information. The United States' Global Positioning System (GPS) and the Russian Global Navigation System (GLONASS) are such radio navigation systems. For GPS, the navigation data has a data rate of 50 bits per second.

The user's receiver, by obtaining the arrival times of the signals transmitted by the satellites in his field of view, which are precisely measured relative to the receiver's own clock, obtains its distances (ranges) to the respective satellites to within a constant bias. The value of the constant bias is equal to the difference between the satellite's and the receiver's clock times. Since the satellites' clocks are synchronized with system time, this constant is the same for all satellites. The distances thus measured are called pseudoranges since they are offset from the actual distances by a constant value which is the same for all satellites tracked. With four or more satellites in view, the four unknowns consisting of the user's position (longitude, latitude, and elevation) and the user's clock offset with respect to system time can be solved using the measured user-to-satellite pseudoranges, and the satellites' ephemeris in the navigation data broadcast by the satellite.

In order to allow the user to measure pseudoranges, the satellites' ranging signals are wide band pseudorandom noise (PRN) coded signals which are radio frequency (RF) carriers modulated by a wide band PRN code, modulo-2 added to the navigation data. Unique PRN codes are used for different satellites, and different types of PRN codes with different chip rates are used for different system applications. In GPS, for example, a 1 MHz chip rate C/A code is used for initial acquisition and less accurate civilian applications, while a 10 MHz chip rate P-code is used for higher accuracy government applications. The PRN codes are designed such that there are minimum cross-correlation between different PRN codes. For example, the GPS C/A codes are 1023 chip length Gold codes which have a maximum periodic cross-correlation value of only 65. This design feature allows the user receiver to separate the ranging signals received from a number of GPS satellites by acquiring and tracking the unique PRN codes of the GPS satellites even though they are transmitted on the same RF frequency (1575.42 MHz for GPS L1, 1227.6 MHz for GPS L2).

A common circuit used to track PRN signals is the delay lock loop which correlates early, punctual, and late versions of the locally generated PRN code against the received signal and obtains an estimate of the time difference between the local code and the received code from the difference between the correlation of the early version of the local code against the received signal and the correlation of the late version of the local code against the received signal.

The accuracy of the user position and time determination of a satellite based radio navigation system is affected by several factors: the accuracy of the satellite ephemeris and clock time given in the satellite broadcast navigation message, the propagation delays introduced by the ionosphere and the troposphere, receiver noise and quantization effects, radio frequency interferences, multipath fading, and the relative geometry of the satellites and the user, which is measured in terms of geometric dilution of precision. Some of these error sources, in particular, the satellite ephemeris and clock errors, the ionospheric and tropospheric delays, can be eliminated in a differential GPS (DGPS) system, which can either be local area differential or wide area differential. In local area differential systems the errors in the determined position of the reference receiver, which is located at a precisely surveyed site, are subtracted from the position solution of the user. For such DGPS applications the user is usually within 10 km of the reference receiver. Under these circumstances the error caused by satellite ephemeris and clock and by ionospheric and tropospheric delays are almost identical at both the user and the reference receiver, and are thus practically canceled in the correction process. The remaining major error sources are then receiver noise, quantization effects, interference and multipath fading. These effects are uncorrelated between the reference and user receivers, and are not canceled from each other in the correction process. To alleviate these effect, a wide area DGPS system (e.g., the FAA's Wide Area Augmentation System) broadcasts correction signals from geostationary satellites to the users. The correction signals are derived from a network of ground reference stations that estimates the satellites' fast clock errors, slow clock and ephemeris errors and ionospheric grid point vertical delays. Similar to the local area DGPS systems, most of the error sources are mitigated in the correction process except for receiver noise, quantization noise, interference and multipath fading. The effects of receiver thermal noise and quantization noise can be reduced with averaging. Interferences can be mitigated with frequency management and regulation. Multipath fading thus becomes the most detrimental error source in a differential GPS system. Sub-meter accuracy can generally be obtained by differential systems if there is no multipath effect. Multipath error in C/A code PRN tracking with early minus late discriminators, on the other hand, can be as big as one chip and is usually several meters in magnitude. Multipath rejection is thus an important design objective in high quality PRN receivers.

The number of multipath signals, their relative delays and RF phase offsets with respect to the direct path signal are all functions of the satellite to user antenna geometry relative to reflecting objects around the receiver antenna. Since multipath signals always travel a longer distance than the direct path signal, they are invariably delayed with respect to the direct path signal and will suffer a loss in power in the reflection process. If the multipath has a delay in excess of one PRN chip in time with respect to the direct path signal, it will not correlate with the local code and will not affect the pseudorange measurement accuracy once the delay lock loop is locked onto the direct path signal. However, if the multipath delay with respect to the direct path signal is within one chip in time, the error signal measuring the relative time offset between the local code and the received signal in an early-minus late discriminator configuration is usually biased by the multipath. For C/A code receivers this problem is significant since the C/A code chip time is 1 microsecond in length, allowing multipaths delayed with respect to the direct path signal by as much as 300 meters to affect the pseudorange measurement accuracy. In addition, since the chip time is 300 meters in length, multipath error, even in a small fraction of a C/A chip, can be very detrimental. Multipath error is thus one of the most troublesome problems faced by PRN receiver designers.

The typical ways used to mitigate multipath effects are: (1) careful site selection and antenna design to modify the gain pattern of the user antenna to reduce the magnitudes of the antenna gain at low elevation angles to eliminate multipath signals reflected by surrounding, low altitude (compared to the satellite) objects; and (2) by receiver processing. Large ground planes and choke ring antennas have been used with some success in the past. However, at L-Band the choke ring antenna is fairly large in diameter, and large ground planes are not always practical on all installations. Receiver processing to reduce multipaths can be implemented in two different ways: (a) by narrowing the spacing of the early minus late correlator (see U.S. Pat. No. 5,495,499, Feb. 27, 1996, Fenton et al.; Van Dierendonck et al, "Theory and Performance of Narrow Correlator Spacing in a GPS Receiver", Navigation: Journal of the Institute of Navigation, vol. 39, No.3 (Fall 1992); and L. Hagerman, "Effects of Multipath on Coherent and Noncoherent PRN Ranging Receivers", Aerospace Corporation Report No. TOR-0073(3020-03)-3 (May 15, 1973)); and (b) by estimating the correlation function parameters that vary with multipath distortion—the parameters of interest discernible from an estimate of the shape of the autocorrelation peak include the direct signal path time and phase offset (see U.S. Pat. No. 5,414,729, May 9, 1995, Fenton). Although approach (a) has a smaller multipath error compared to the conventional early minus late correlator with one chip spacing, it still exhibits a significant non-zero multipath error for multipath delays of up to one chip with respect to the direct signal. Approach (b) has the drawback of a relatively high hardware implementation complexity and cost, and may experience large errors before the numerical computation converges to a correct solution.

FIG. 1 shows the error envelope of an early minus late correlator with one chip and 0.2 chip spacings, respectively, caused by a specular multipath at half of the signal's amplitude and at various delays with respect to the direct signal of up to and exceeding one chip. The upper curves 201, 202 (with positive pseudorange errors) correspond to the cases where the multipath is in RF phase with the direct signal. The lower curves 203, 204 (with negative pseudorange errors) correspond to the cases where the multipath is 180 degrees out of RF phase with respect to the direct signal. The computed maximum pseudorange error of the conventional one-chip early minus late correlator is 0.25 chips (75 meters) with this multipath amplitude. The maximum error of the 0.2 chip spacing early minus late correlator is about 0.05 chips (15 meters) with the same multipath amplitude. In the narrow spacing early minus late correlator the maximum pseudorange error does not decrease before the multipath delay is larger than one chip. This means that multipaths at varying delays for up to one chip can result in the maximum pseudorange error which can only be reduced by narrowing the correlator spacing. The results in FIG. 2 demonstrate that some improvement in the multipath rejection capability of the early minus late type of correlators will be desirable and also necessary.

What is needed is a way to reduce the pseudorange measurement error of a PRN receiver, especially those of the low chip rate C/A code type, in the presence of multipath distortion. The desired method of implementation should be relatively low cost and simple in hardware complexity, and able to eliminate pseudorange errors caused by multipaths with delays with respect to the direct signal exceeding a small fraction of a PRN chip (e.g., 0.05 to 0.01 chips, or 15 to 30 meters in the case of C/A code receivers). The desired implementation should not degrade signal acquisition capability of the receiver, should be able to operate in both the coherent and noncoherent modes, and should not require special antenna designs or site selection.

SUMMARY

Briefly, the invention is an improved PRN receiver which mitigates the pseudorange error caused by multipaths which are delayed by a small fraction of a chip relative to the direct signal (e.g., multipath with a 0.05 to 0.1 chip delay, which corresponds to a range difference of about 15 to 30 meters with respect to the direct signal for C/A codes) with a delay lock loop implementation which derives its code timing error signals by summing the I, Q samples of the received signal weighted by a code phase detection waveform across two adjacent chips of the local code. The code phase detector waveform is synchronized with the local code; it changes polarity according to the polarity of the current PRN chip polarity. The code phase detector waveform is constructed with the intent to mitigate the effect of pseudorange errors due to multipath fading. This waveform is referred herein as the W-discriminator waveform.

The implementation of this receiver, and in particular, the code tracking function which provides the multipath rejection capability, comprises: 1) RF down-converter and IF sampling A/D circuits, 2) digital correlators that multiply the inphase and quadrature A/D samples of the received PRN signal with the local PRN code and with the local W-discriminator waveform, 3) local code generator circuits that generate the polarities of the punctual PRN code of the PRN signal desired to be tracked, 4) local generators of the W-discriminator waveform that is synchronized with the local code timing and changes polarity according to the current chip polarity, 5) adder circuits that sum the output samples of the digital correlator outputs, 6) code timing phase detector circuits that generate, from the adder outputs, an error signal proportional to the relative time offset between the local code timing and the timing of the received signal, 7) a loop filter circuit that averages the code phase detector output, and estimates the code rate Doppler, and 8) a code NCO (Numerical Control Oscillator) circuit that controls the timing of the local punctual code by either advancing or retarding its code epoch time according to the output of the loop filter. The code phase detector can be coherent or noncoherent. The noncoherent mode of operation is applied prior to carrier phase recovery. The coherent mode of operation is used after carrier phase lock is established.

Typical characteristics of the W-discriminator waveform are illustrated in FIG. 2. The W-waveform comprises a number of digital samples with non-zero values across two adjacent chips of the local punctual PRN code. These digital values, which are multiplied with the incoming samples of the received signal, are not necessarily all ones or minus ones, and may in general take on non-uniform values. The duration of the W-waveform across two adjacent chips is referred to as gate width in this specification, and is measured in fraction of a PRN chip. Two distinct classes of W-discriminators have been identified, W1 and W2, along with a third class of W-discriminator waveform W3 which is formed as a combination of W1 and W2. In W1 the W-waveform is used to multiply the incoming signal samples only when there is a transition between the current chip and the preceding chip. In W2 the W-waveform is used to multiply the signal samples on every chip, regardless of transitions. In W3 the discriminator response is a combination of the responses of W1 and W2, and the combination can be a linear (weighted) combination or a non-linear combination of the W1 and W2 responses. The W1-discriminator exhibits better noise performance than the W2-discriminator, while the W2-discriminator exhibits better multipath rejection capability than the W1-discriminator. The intent of the W3-discriminator is to combine the advantages of W1 and W2 to derive an optimum combination which gives an overall satisfactory performance of the discriminator in terms of receiver noise and multipath rejection performances. Both the W-discriminator and the conventional early-late or narrow spacing correlator (see Van Dierendonck et al., supra) can be implemented by multiplying the incoming quadrature samples of the baseband incoming signal by a discriminator waveform which spans across each pair of adjacent chips of the local PRN code. The major distinction between the W-discriminator and the early-late or narrow spacing correlator is that while the discriminator waveforms of the early-late or narrow spacing correlators take on a uniform value (+1 when there is a negative to positive chip transition, −1 when there is a positive to negative chip transition, and 0 when there is no transition), the W-discriminator does not take on a uniform (or, constant) value over the span of the discriminator waveform across any two adjacent PRN chips. The polarity of the W-discriminator waveform depends on direction of chip transition (e.g., a +W waveform for negative to positive chip transition, and a −W waveform for positive to negative chip transition). However, the pattern of the W-discriminator is not single-valued across two adjacent chips like the early-late or narrow spacing correlator, and is designed with the special intention to mitigate multipath. The gate width of the W-discriminator waveform is dynamically adjusted, such that in an initial acquisition mode, the gate width is relatively wide, on the order of approximately half a chip time. Then, once PRN code lock is achieved, the gate width is narrowed to a fraction of a PRN chip time. Transition from a conventional early minus late correlator to the W-correlator is applied to avoid locking on multipath during initial acquisition. However, once code lock is achieved with the W-discriminator, the receiver's pseudorange measurement error caused by multipath is significantly reduced.

DESCRIPTION OF THE FIGURES

The above and further advantages of the invention may be better understood by referring to the following description in conjunction with the accompanying drawings.

FIG. 8 illustrates the Type 2 W-discriminator (denoted as W2) operations and the W2-discriminator waveform used to weight the I, Q samples of the incoming signal to derive the error signal of the delay lock loop. The W2-waveform is non-zero across each pairs of chips which may or may not have a chip transition (i.e., polarity change) between them.

DETAILED DESCRIPTION

The process through which this invention is described is summarized in the following paragraphs, and is illustrated in FIGS. 3, 4, 5, 6, 7, 8, 9, 10 and 11.

The first step in this development is the recognition that an early minus late discriminator can be implemented by multiplying the received I, Q samples with a code phase detection waveform which is non-zero only across two adjacent chips which have a chip transition (i.e., chip polarity change). This code phase detection waveform is called the E-L discriminator waveform which is different with respect to the W-discriminator waveform mentioned above, and the value of the E-L discriminator waveform is either all one's (for a negative to positive chip transition) or all minus one's (for a positive to negative chip transition). The width of the E-L discriminator waveform is equal to the spacing of the early and late correlators described in the references cited in the previous sections.

Figure 3:
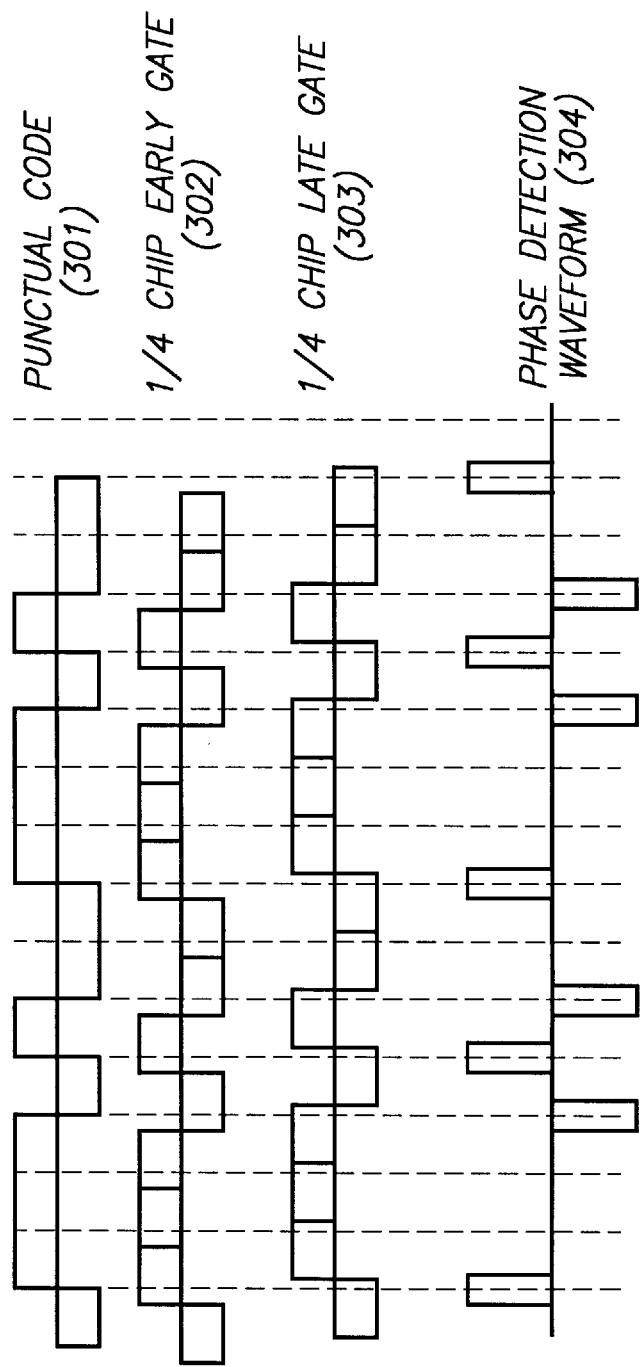
FIG. 3 illustrates the recognition that the E-L discriminator can be implemented with a constant +1 or −1 waveform across each pair of local PRN code chips which have a chip transition between them. This E-L discriminator waveform is used to weight the incoming I and Q samples of the received signal to derive the delay lock loop error signal.

The development of the E-L discriminator waveform (304) is illustrated in FIG. 3. The function of the early-late discriminator is to correlate the incoming signal with the early and late versions (302, 303) of the local punctual PRN code (301). Since the correlation operation is linear, the difference between the correlations of the early and late codes against the incoming signal is equal to the correlation of the difference between the early and late versions of the local code (i.e., the early code minus the late code) against the incoming signal. The early code minus the late code (304) is a three valued function, having values 0, +2, and −2. After normalization by its peak amplitude the difference code is a waveform having values +/−1 across two adjacent chips for a span which is equal to the spacing of the early and late codes when there is a chip transition, and having the value zero when there is no transition. This E-L discriminator waveform is also illustrated in FIG. 3 (denoted as the phase detector waveform 304). The width of the non-zero period of the waveform is equal to the spacing of the early and late correlators. In FIG. 3 the spacing between the early and late correlators is 0.5 PRN code chips. Thus the width of the E-L discriminator waveform is also 0.5 PRN code chips.

Figure 4:
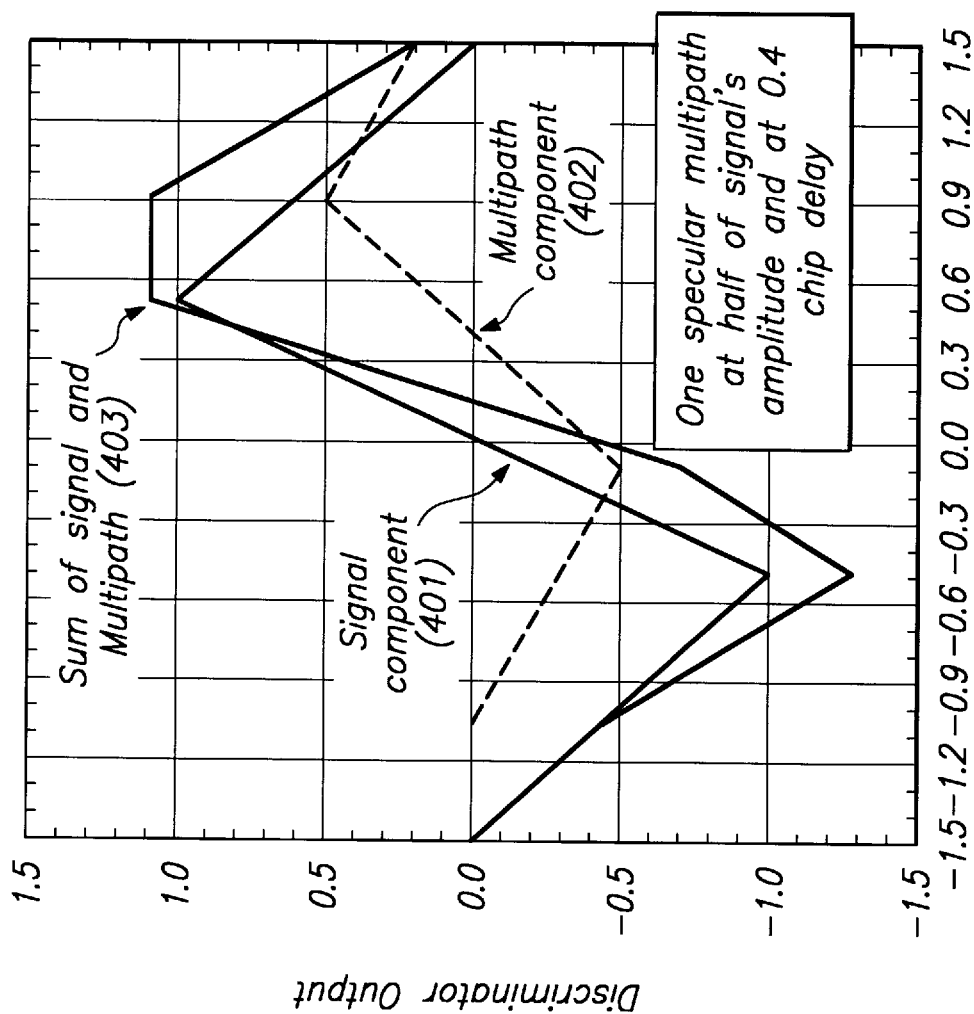
FIG. 4 plots the responses to the signal and multipath, respectively, and the response to the combined signal and multipath, of a 1-chip spacing E-L discriminator. It serves to illustrate the mechanism by which the multipath creates an error in the pseudorange measurement of a 1-chip spacing E-L discriminator. The 1-chip spacing E-L discriminator is significantly affected by the specular multipath delayed by 0.4 chips with respect to the direct signal.
Figure 5:
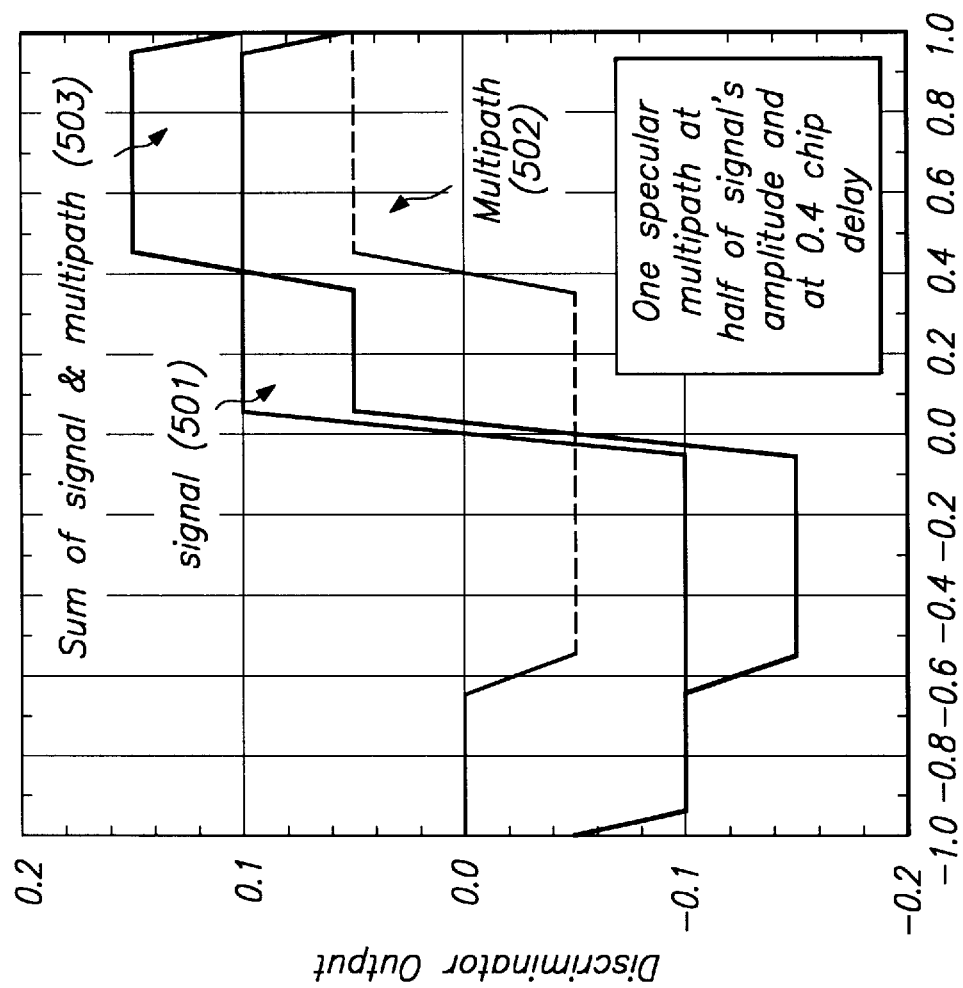
FIG. 5 plots the responses to the signal and multipath, respectively, and the response to the combined signal and multipath, of a 0.1-chip spacing E-L discriminator. It serves to illustrate the mechanism by which the multipath creates an error in the pseudorange measurement of a 0.1-chip spacing E-L discriminator. The 0.1-chip E-L discriminator is also affected by the multipath delayed by 0.4 chips with respect to the direct signal, though the pseudorange error is reduced.

The next step in the development of this invention is the recognition of the mechanism by which multipath signals create pseudorange errors in the early minus late correlator type of code phase discriminators. FIGS. 4 and 5 plot the output values of an early minus late discriminator with a 1-chip spacing and with a 0.1 chip spacing, respectively. The output values (401, 402, 501, 502) created by the direct signal component and the multipath component, and the sum of these two (403, 503) are both shown. In both figures, one single (specular) multipath is assumed present which is in RF phase with the signal, has an amplitude which is equal to one-half of the signal's amplitude, and is delayed by 0.4 chip with respect to the direct signal. In the case of the one-chip spacing E-L discriminator (FIG. 4) it is shown that the composite discriminator output (403) due to signal and multipath has a zero crossing at approximately 0.15 chips (45 meters for C/A code) away from code alignment. The mechanism that creates this error is that the 1-chip spacing E-L discriminator response has a fairly wide span (+/−1.5 chips), with non-zero discriminator output values even if the signal is over one chip (up to +/−1.5 chips) away from the local code timing (see FIG. 4). Thus, even if the multipath is 0.4 chips delayed with respect to the direct signal, it creates a significant non-zero component at the local code position which is aligned with the direct signal (−0.4 approximately, or −40%). Consequently the composite discriminator output due to both signal and multipath is offset from the discriminator output of the signal component only. The large span of the 1-chip E-L discriminator has the advantage of a wide pull-in range during initial acquisition of the delay lock loop. However, it suffers from multipath distortion when it is used for ranging.

Figure 2:
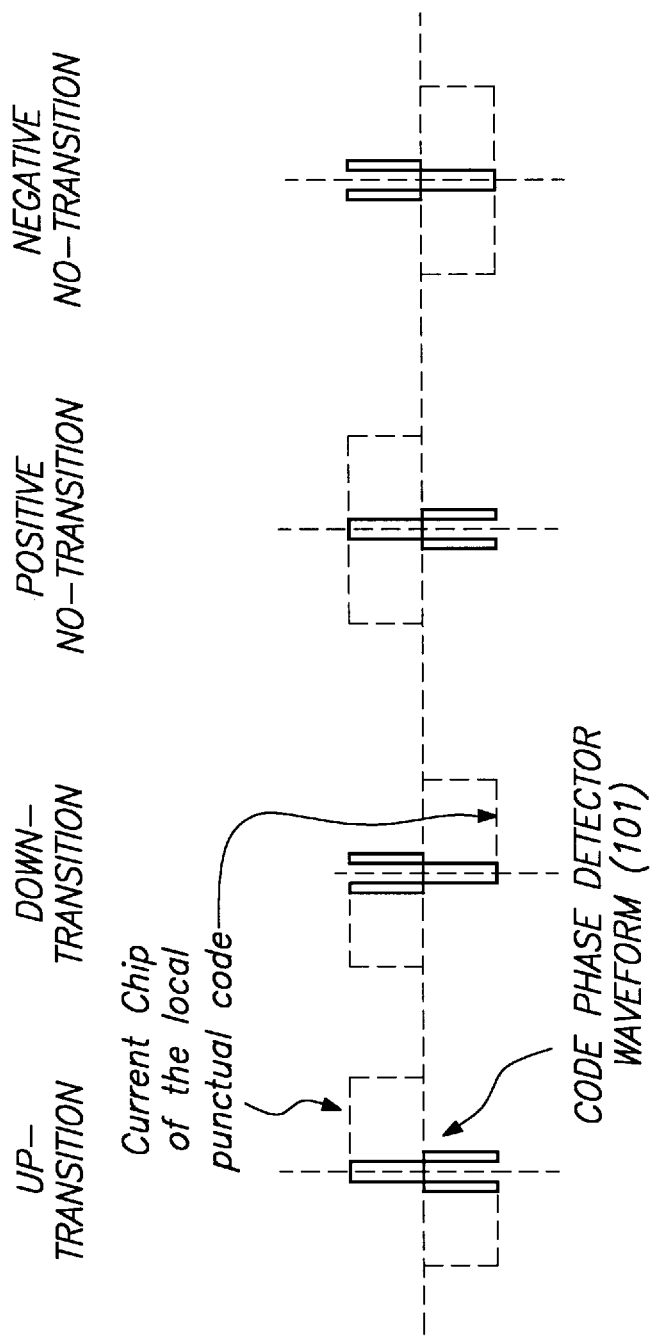
FIG. 2 illustrates a typical W-discriminator code phase detection waveform.

Early minus late discriminators with narrower spacing has a smaller magnitude of pseudorange error when compared to the one-chip spacing early minus late discriminator. FIG. 5 shows the response of the 0.2 chip spacing E-L discriminator with a specular multipath having the same amplitude and delay as in FIG. 4. However, the error is still apparent (~0.05 chips, or about 15 meters for C/A code). In fact, this magnitude of pseudorange error will persist even when the multipath is further delayed with respect to the signal, and will not diminish until it is about 0.95 chips delayed with respect to the signal (see also the error envelope 202 plotted in FIG. 2). This indicates that the narrow spacing discriminator does not give additional rejection to multipaths which are further delayed with respect to the direct signal than the nearby multipaths, and multipaths with delays up to 0.95 chips will create pseudorange errors with the same maximum magnitude with the narrow spacing discriminator if the multipath amplitudes are the same. For both the one-chip spacing and 0.1 chip spacing E-L discriminator, the multipath error is created by the same basic mechanism: the large span of the discriminator response. Though the maximum magnitude of the discriminator response of the 0.1 chip spacing E-L discriminator is clipped and is significantly smaller than that of the one-chip E-L discriminator (0.1 compared to 1.0), the non-zero span of the discriminator response is not significantly reduced, allowing multipaths with delays up to 0.95 chips to affect pseudorange measurements.

The third step in the development of this invention is to realize that if the non-zero span of the discriminator response can be made smaller than that of the E-L discriminator, then the discriminator will be less sensitive to multipath fading. In particular, since multipaths are always delayed with respect to the signal, it is desirable to have discriminator responses to have zero values for all negative time offsets (i.e., for the local code to be earlier with respect to the signal's arrival time, or equivalently, for signals arriving later than the local PRN code time) if possible, and have non-zero response only for a very small fraction of a chip as to allow a tracking error signal (also called the S-curve). This will limit the number of multipaths which have delays exceeding a small fraction of a chip with respect to the direct signal from affecting pseudorange measurements. Towards this goal modifications of the E-L discriminator waveform to include waveforms that do not have the same sample values (i.e., not having an uniform value of +1, or −1, or 0) over its span across two adjacent chips are investigated, with the goal to identify patterns which will result in the desirable discriminator response described above.

Figure 10:
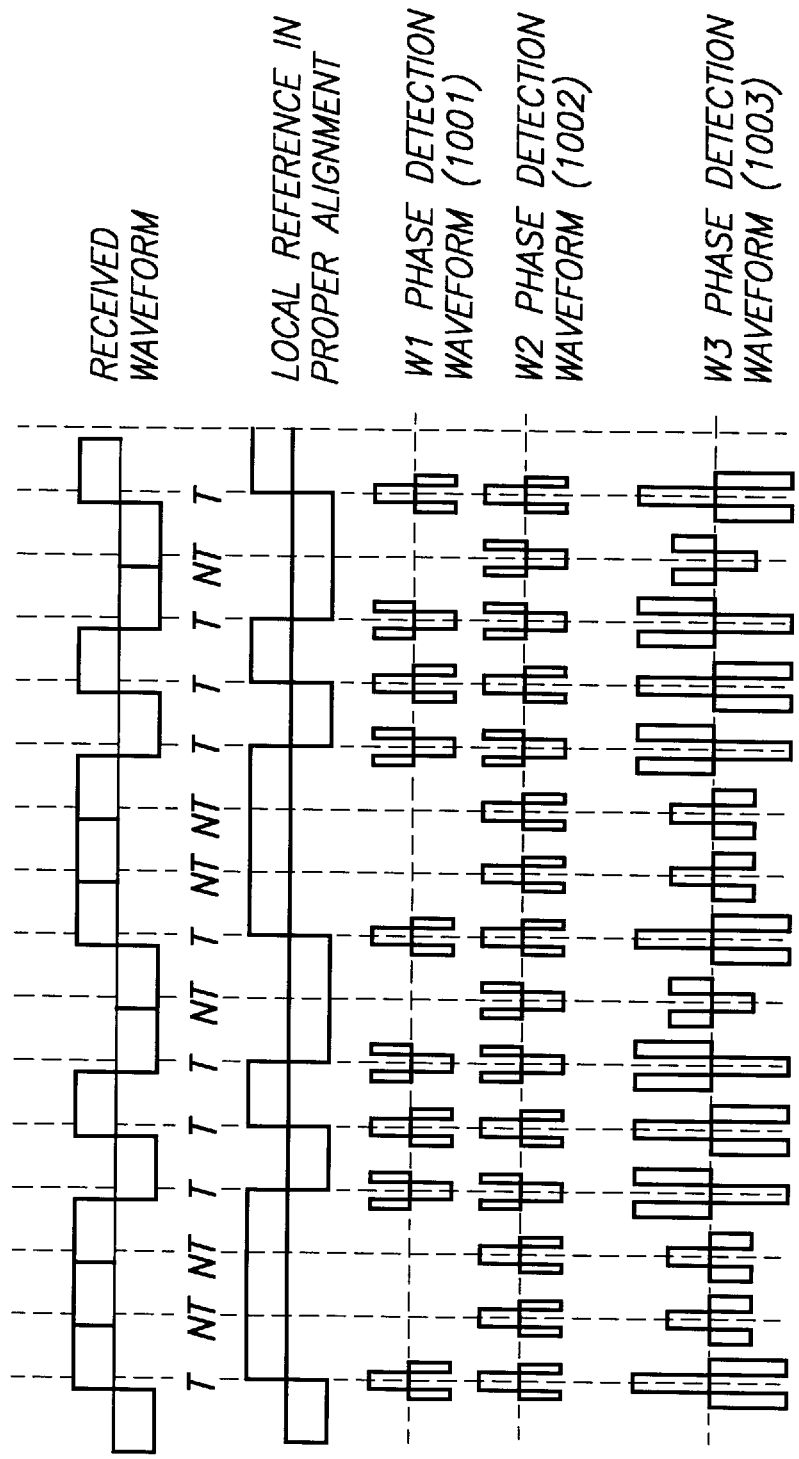
FIG. 10 illustrates the discriminator waveform of a typical W3-discriminator.
Figure 11:
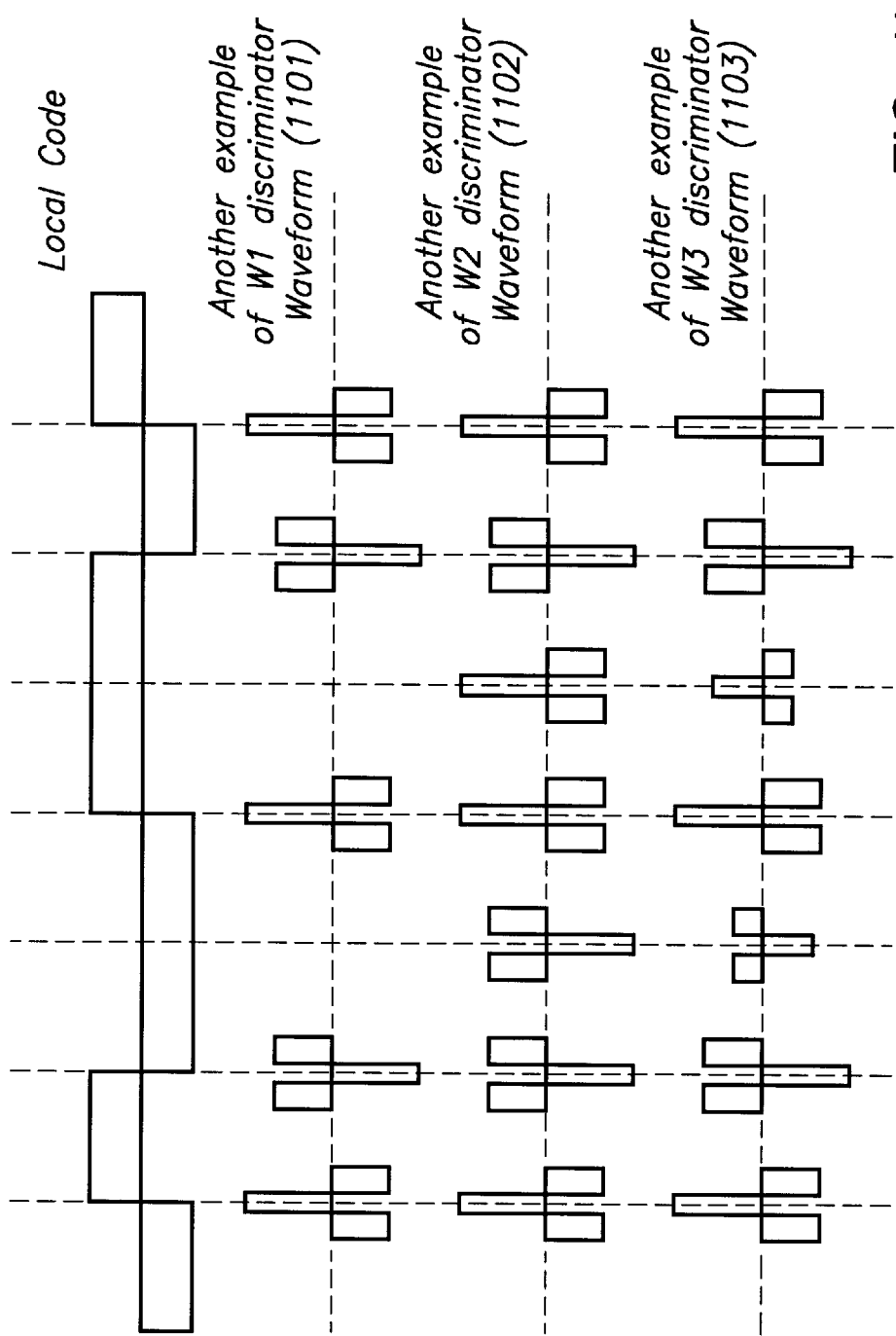
FIG. 11 illustrates other example waveforms of the basic W-discriminator.

The W-discriminator waveform is developed based on the observations illustrated in FIGS. 6A, 6B, 7, 8 and 9. Two types of operations are identified: W1 (FIG. 6A, 601) and W2 (FIG. 8, 801), along with a third type W3 (FIG. 10, 1001) which is a combination of W1 and W2. The operation of the W1, W2 and W3-discriminator are not limited to the waveforms illustrated in FIGS. 6A, 6B, 8 and 10. Other examples of the basic waveforms can also be constructed. FIG. 11 illustrates other examples (1101, 1102 and 1103) of the W1-waveform, W2-waveform and W3-waveform.

Figure 6A:
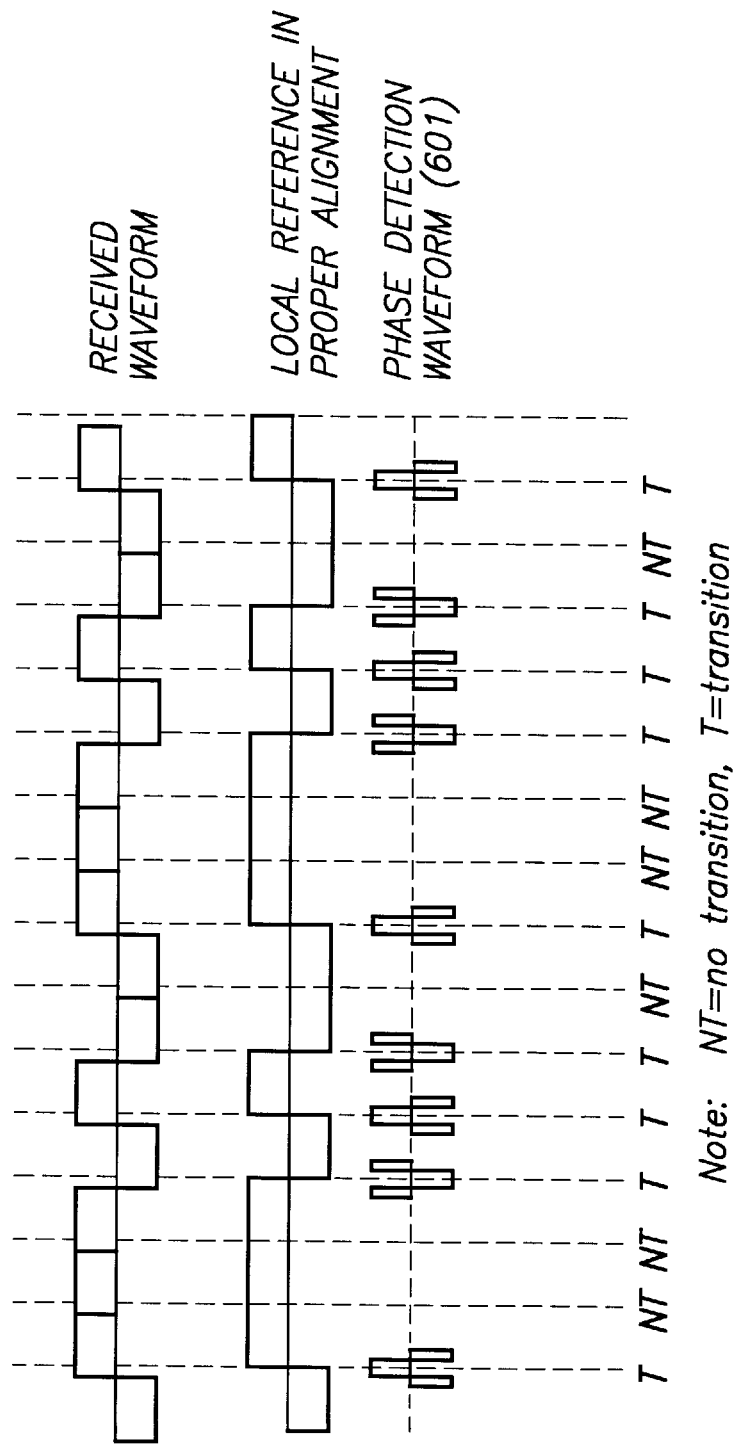
FIG. 6A illustrates the Type 1 W-discriminator (denoted as W1) operations and the W1-discriminator waveform used to weight the I, Q samples of the incoming signal to derive the error signal of the delay lock loop. The W1-waveform is nonzero only across pairs of chips that have a chip transition (i.e., polarity change) between them.

The W1-discriminator waveform shown as 601 in FIG. 6A is similar to the E-L discriminator waveform in the sense that it has non-zero values only across two adjacent chips which have a chip transition. However, over this span (or gate width) the sample values of the W1-waveform is, unlike the E-L discriminator waveform, not all +1's or −1's. The W1-discriminator waveform, for example, has the sample values −++− across two adjacent chips which have a negative to positive chip transition, and the values +−−+ across two adjacent chips which have a positive to negative transition, and the values zero across two chips that do not have a transition, and anywhere else. The number of +'s and −'s in the W-discriminator waveform depends on its gate width and the I and Q A/D sample rate. For example, if a 40 MHz A/D is used there will be 40 I and 40 Q samples over each chip. And there will be 4 samples in the non-zero periods of the W-discriminator if the gate width is 0.1 chips. In addition, the length of the + and − pulses are not necessarily of equal durations.

If the autocorrelation function of a PRN coded waveform is denoted by $R(\tau)$, where:

$$R(\tau) = 1 - |\tau|/T_c \quad \text{if } |\tau| <= T_c$$
$$= 0 \quad \text{otherwise}$$

and where $\tau$ denotes the time offset between the local code timing and the received code timing, and $T_c$ denotes the chip time, then the coherent mode E-L discriminator response is given as follows:

$$D_{E-L}(\tau) = R(\tau - \delta/2) - R(\tau + \delta/2)$$

Figure 6B:
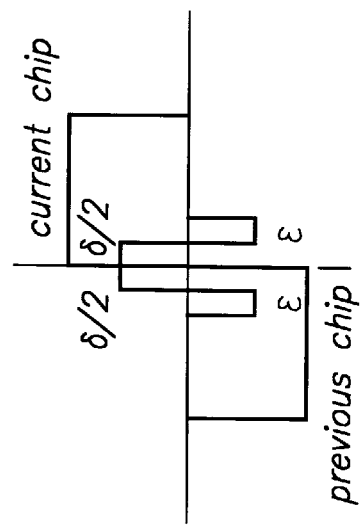
FIG. 6B illustrates a previous chip, current chip and the gate widths of the W1-discriminator.

For the W1-discriminator with the basic waveforms across two chips with negative to positive transitions as illustrated in FIG. 6B (602) the discriminator response can be given as the sum of three E-L discriminators, one at the center, one earlier than the center one but with negative values, and another later than the center one and also with negative values:

$$R_{w1}(\tau) = [R(\tau - \delta/2) - R(\tau + \delta/2)] - [R(\tau - \epsilon/2 - x) - R(\tau + \epsilon/2 - x)] - [R(\tau - \epsilon/2 + x) - R(\tau + \epsilon/2 + x)];$$

and
where $x = \epsilon/2 + \epsilon/2$.

Figure 7:
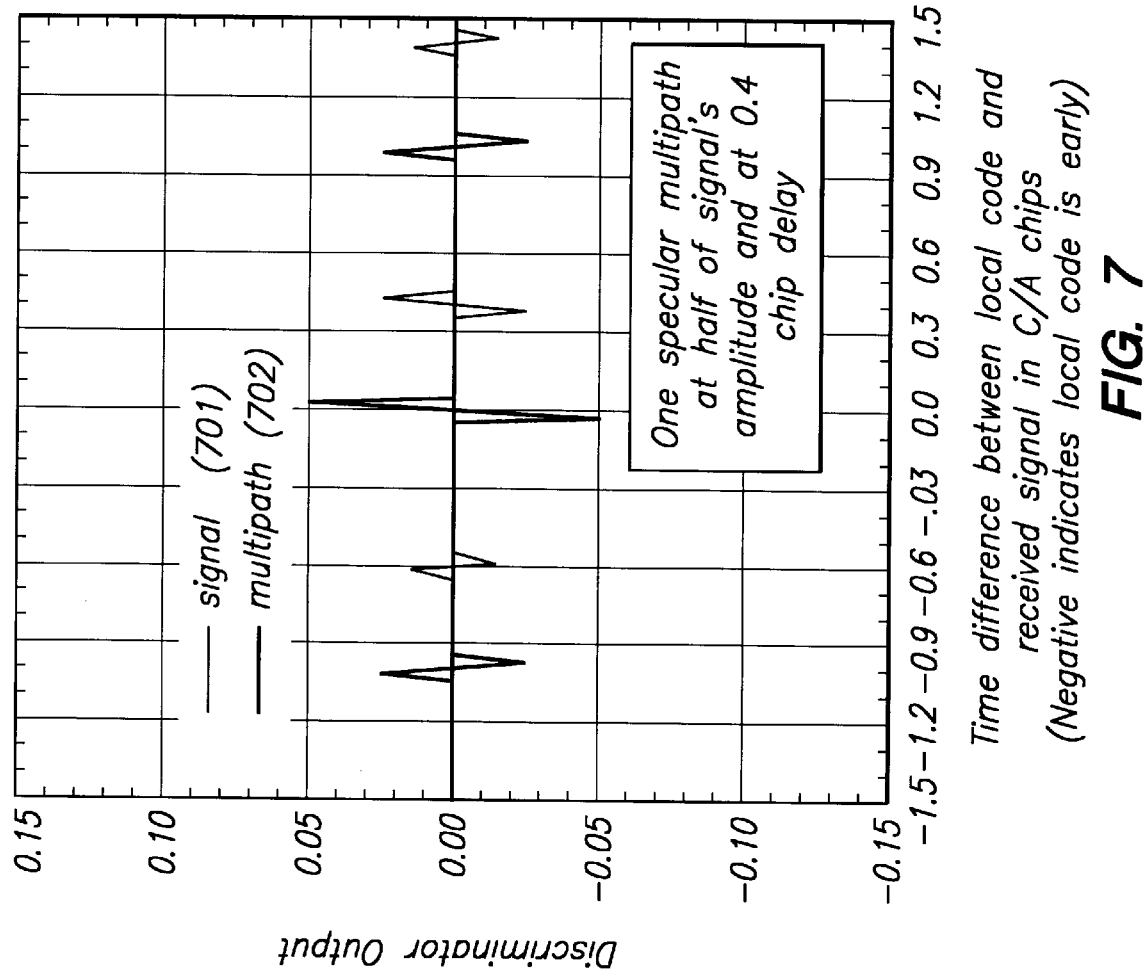
FIG. 7 is a plot showing the responses to the signal and multipath of the W1-discriminator. It shows that the non-zero span of the W1-discriminator response is significantly narrower than the E-L discriminator response, and the multipath at 0.4 chip delay with respect to the direct signal does not induce any pseudorange error if the W1-discriminator with a 0.1 chip gate width is used in the delay lock loop.

The resultant W1-discriminator responses (701, 702) are plotted in FIG. 7, for both the signal component and for a specular multipath which is delayed 0.4 chip with respect to the signal and has an amplitude which is equal to one half of the signal. As shown in FIG. 7, the non-zero span of the W1-discriminator responses is equal to its gate width (0.1 chip in FIG. 7) and is significantly narrower than that of the E-L discriminator. Consequently, the discriminator's responses to the direct signal and the multipath do not overlap each other and the multipath does not create any error on the pseudorange measurement unless it is within a 0.05 chip delay with respect to the signal. However, since the W1-discriminator also has non-zero responses centered around +/−1 chip away from the signal's arrival time, a multipath delayed by exactly one chip with respect to the signal would also affect pseudorange accuracy. In practice this effect of this type of multipath is small for the C/A code application since they are usually reflected from objects relatively far away (300 m) from the receiver antenna and consequently are low amplitude multipaths and would not introduce significant pseudorange errors.

Figure 1:
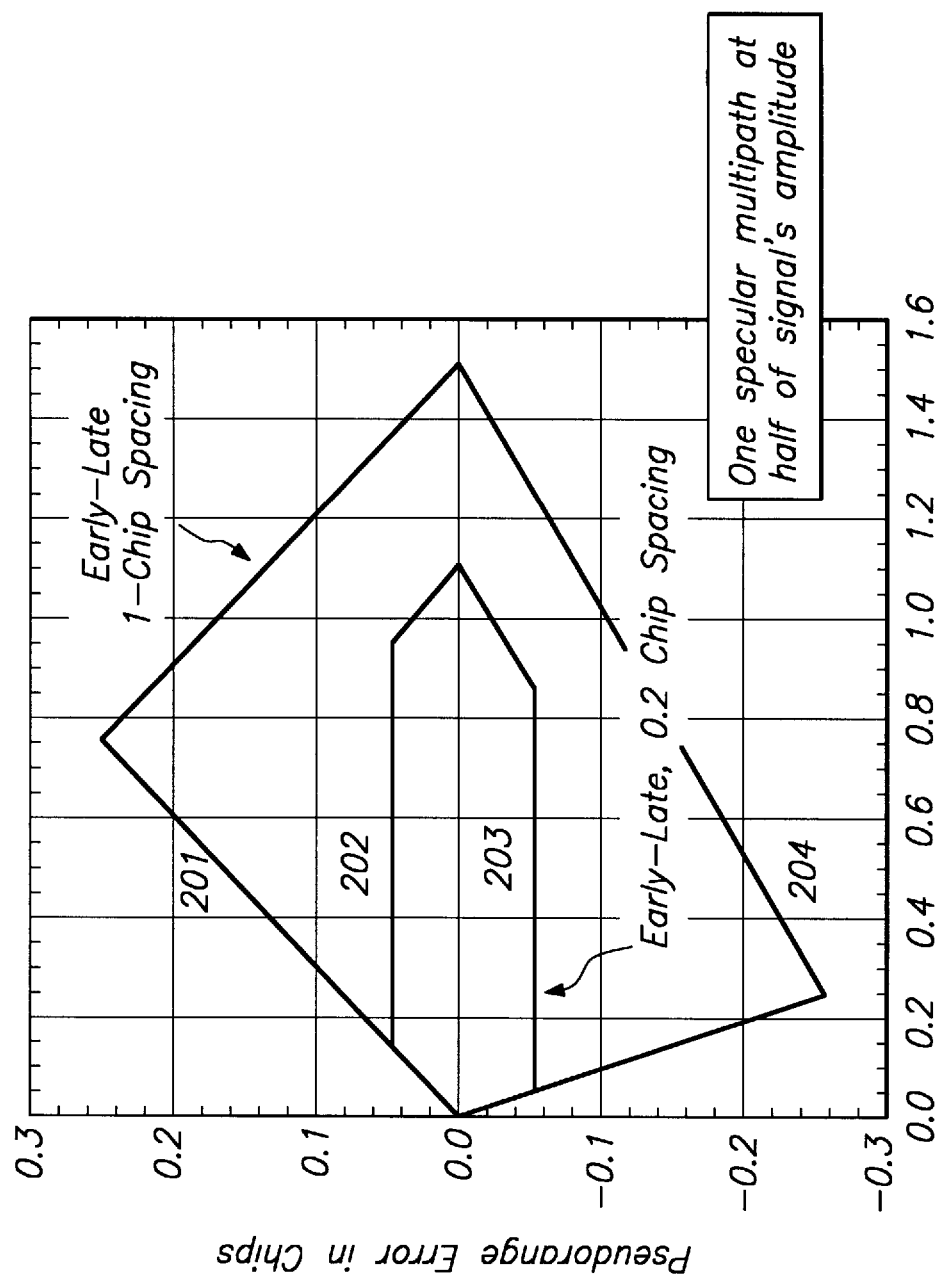
FIG. 1 is a plot of the error envelopes of conventional early minus late (E-L) discriminators with 1-chip and 0.2-chip spacings, respectively, when there is a specular multipath present which has an amplitude equal to half of the signal's amplitude. This figure illustrates the need for improvement for multipath rejection of the currently state-of-the-art delay lock loop code phase discriminators.
Figure 9:
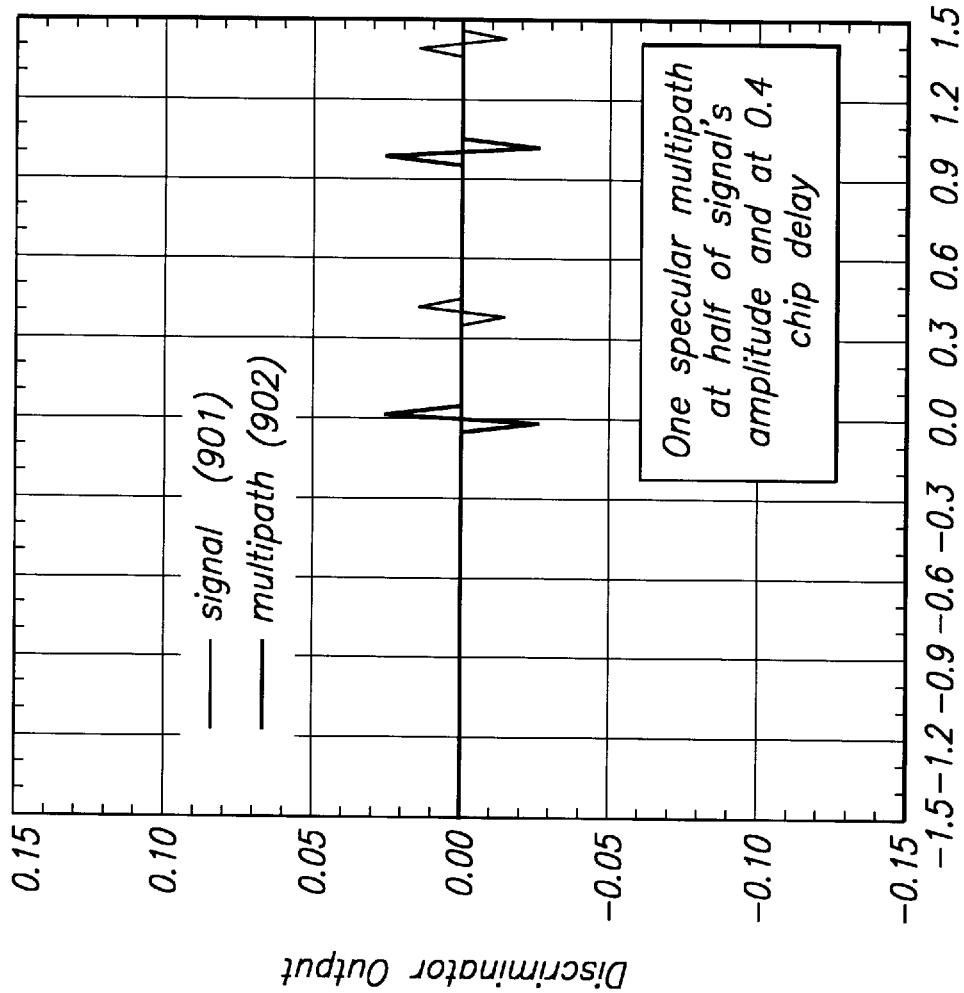
FIG. 9 is a plot of the responses to the signal and multipath of the W2-discriminator. It shows that the non-zero span of the W2-discriminator response is significantly narrower than the E-L discriminator response, and the multipath at 0.4 chip delay with respect to the direct signal does not induce any pseudorange error if the W2-discriminator with a 0.1 chip gate width is used in the delay lock loop. Furthermore, the W2-discriminator response does not have non-zero values for local PRN code time which is earlier than the signal arrival time by a small fraction of a chip. This property provides further multipath rejection than that of the W1-discriminator even though the W1-discriminator has better thermal noise performance than the W2-discriminator.

In addition to W1, a second way to apply the W-discriminator waveform, referred to as the W2-waveform herein, is also identified. The W2-waveform is placed across each pair of adjacent chips with or without chip transitions, as illustrated in FIG. 8 (801). The polarity of the W2-waveform depends only on the current chip. The incoming signal samples are weighted by the W2-waveform depicted in FIG. 1 as waveform 101 when the current chip is positive, and the negative of the above waveform when the current chip is negative. If the received code is aligned with the local code the weighted sums of the signal samples by the W1- or the W2-discriminator functions are identically equal to zero, as expected. When the W2-waveform is used to multiply signal samples across two chips which do not have a transition, however, it will also give a zero value regardless of timing error. Thus only noise comes in when the W2-waveform is applied across two chips without a transition. This implies that the W2-discriminator is inferior to the W1-discriminator in terms of receiver noise performance. However, as illustrated in FIG. 9, the response of the W2-discriminator is more desirable than the W1-discriminator for multipath rejection since its response (901) does not have non-zero value when the local code time is more than half of the W2 gate width earlier than the signal's arrival time. This implies that the one-chip delayed multipath, which can affect the W1-discriminator, will have no effect on the W2-discriminator, even though the W2-discriminator is inferior to the W1-discriminator in terms of receiver noise performance. As illustrated in FIG. 9, the discriminator response (902) to a specular multipath delayed with respect to the signal by 0.4 chips does not overlap with the discriminator's response to the desired signal, and would not introduce error in pseudorange measurements.

A third type of the W-discriminator, W3, which is also covered in this specification is the discriminator response which is formed as a linear or non-linear combination of the responses of W1 and W2. FIG. 10 shows an example of this construction in which W3 is obtained as a linear combination of W1 and W2, with equal weighting. In FIG. 10 the W1-discriminator waveform (1001) is added to the W2-discriminator waveform (1002) to obtain the W3-discriminator waveform (1003). In general, W3 can also be constructed as linear combination of W1 and W2 with different weights, expressible as $$W3 = aW1 + bW2$$

where a, b are positive constants which may have different values, or as non-linear combination of W1 and W2, expressible as $$W3 = af(W1) + bg(W2)$$

where f and g are odd functions and a, b are constants.

The advantage of W3 is that it is a designed compromise between W1 and W2, giving an optimally selected compromise performance between multipath rejection and receiver noise performance. In the example shown in FIG. 10 the W3-discriminator waveform across adjacent chips with a transition has larger values than the discriminator waveform across adjacent chips without a transition. Thus it allows less noise into the receiver than W2. On the other hand, its delay error introduced by multipaths delayed exactly by one chip with respect to the desired signal is also reduced as compared to W1. The constants a and b can be optimally selected to provide the desired combination of W1 and W2 to give the best compromise performance between code error due to receiver noise and multipath impacts.

The general application of W-discriminator waveform for the generation of code timing error signals for delay lock loop application is covered in this specification, including both types of discriminator waveforms such as W1, W2, and W3, and also including waveforms patterns which are not described in FIGS. 6 and 8, but are intended to mitigate the effect of multipath by selecting a not-one-valued waveform over the discriminator waveform span (i.e., gate width) across two adjacent chips. In general, the W-discriminator waveform with the following characteristics are effective for multipath rejection when used across adjacent chips with chip transitions (like the operation of W1), or across each pair of adjacent chips with or without chip transitions (like the operation of W2):

1) The W-discriminator waveform must be integrated to be zero across its span (i.e., gate width); and 2) A portion of the W-discriminator waveform across two adjacent chips must have a constant value.

FIG. 11 illustrates another example of the W-discriminator waveform which is different than the ones depicted in FIGS. 6 and 8. Unlike the basic waveform illustrated in FIGS. 6 and 8, which has four portions of equal durations and sample values −1, +1, +1, and −1 across each pair of adjacent chips, the basic waveform shown in FIG. 11 has three portions of equal durations across two adjacent local PRN code chips, the middle portion has sample values +2, and the portions preceding and following this middle portion both have sample values −1. Both examples of the basic waveform satisfy the characteristics 1 and 2 above, and are both capable of multipath rejection. Waveform 1101 depicts the operation of the W1 type using this basic waveform across adjacent chips with transition only. Waveform 1102 depicts the W2 type of operation using this basic waveform across adjacent chips with or without chip transition. Waveform 1103 illustrates the W3 type of operation using this basic waveform. Both examples of the basic W-discriminator waveform as illustrated is FIGS. 6, 8, and 11, and the three types of operations: W1, W2, and W3 are all covered in this description of the preferred embodiment.

In general, the sample values of W-discriminator waveform is used to multiply the inphase and quadrature samples of the received signal. The timing of the W-discriminator waveform is synchronized to the timing of the local punctual code. The values and polarities of the W-discriminator waveform samples depends on the polarity transition of the two adjacent chips of the local PRN code across which is the span of the W-discriminator waveform. In particular, the W-discriminator waveform value and polarity depend on the following four conditions of the local PRN code:

i) a negative to positive transition between the two adjacent chips;

ii) a positive to negative transition between the two adjacent chips;

iii) both adjacent chips are positive and there is no transition; and iv) both adjacent chips are negative and there is no transition.

After the inphase and quadrature samples of the incoming signal are multiplied by the sample values of the W-discriminator waveform they are summed (or averaged) to obtain an estimate of the code timing error signal which is used to control the local code timing. This operation can be either coherent or noncoherent. The coherent mode is used only after carrier phase recovery is achieved. The noncoherent mode is used before carrier recovery is achieved and is thus the initial code tracking mode before the receiver switches to the coherent mode. The coherent mode operates on the inphase samples only, while the noncoherent mode operates on both the inphase and quadrature samples of the incoming signal. The operations of these modes can be represented by the following equations described below.

A. Coherent Mode W-discriminator Equations of Operation:

1) Multiply the incoming inphase channel signal I(t) by the local PRN code and integrate over an integration period $T_{INT}$ to form the data polarity estimate of the incoming spread spectrum signal:

$$\tilde{d} = SGN \left[ \int_0^{T_{INT}} PRN_{Local}(t) \times I(t) dt \right] \quad (1)$$

2) Multiply I(t) by the W-discriminator waveform (either W1, or W2, or W3, which is the choice of the designer) formed according to the polarity transitions of local PRN chips according to the local PRN code signal, and integrate over the same integration interval as above to obtain an estimate of the delay error of the incoming signal with respect to the local PRN code time base. This quantity is an estimate of the delay of the arriving signal, except that it is modified by the data polarity of the incoming signal, and would need to be eliminated by use of data polarity estimate obtained in the first operation.

$$d \times \tilde{\tau} = \int_0^{T_{INT}} W(t) \times I(t) dt \quad (2)$$

3) Obtain the coherent mode W-discriminator's delay error estimate of the incoming signal as the product of the above two quantities:

$$\tilde{\tau} = SGN \left[ \int_0^{T_{INT}} PRN_{Local}(t) \times I(t) dt \right] \times \int_0^{T_{INT}} W(t) \times I(t) dt$$

B. Noncoherent Mode W-discriminator Equations of Operations:

1) Form the data polarity estimates of both the inphase and quadrature samples of the incoming signal by multiplying the incoming inphase and quadrature signals I(t) and Q(t) by the local PRN code signal and integrate the product signals over an integration period $T_{INT}$:

$$\tilde{d} \times \cos\theta = \int_0^{T_{INT}} PRN_{Local}(t) \times I(t) dt \quad (3)$$

$$\tilde{d} \times \sin\theta = \int_0^{T_{INT}} PRN_{Local}(t) \times Q(t) dt$$

where p is the relative phase between the receiver and the incoming signal, which is not zero in the noncoherent mode.

2) Multiply I(t), Q(t) respectively by the W-discriminator waveform (either W1, or W2, or W3, which is the choice of the designer) formed according to the polarity transitions of local PRN chips according to the local PRN code signal, and integrate over the same integration interval as above to obtain an estimate of the delay error of the incoming signal with respect to the local PRN code time base on both the inphase and quadrature channels. These quantities are estimates of the delay of the arriving signal in the inphase and quadrature channels, except that they are modified by the data polarity of the incoming signal, and would need to be eliminated by use of data polarity estimates obtained in the first operation.

$$d \times \tilde{\tau} \times \cos\theta = \int_0^{T_{INT}} PRN_{Local}(t) \times I(t) dt \quad (4)$$

$$d \times \tilde{\tau} \times \sin\theta = \int_0^{T_{INT}} PRN_{Local}(t) \times Q(t) dt$$

3) Obtain the noncoherent mode W-discriminator estimate of the delay error of the arriving signal with respect to the local PRN code time as follows.

$$\tau = \left[ \int_0^{T_{INT}} PRN_{Local}(t) \times I(t) dt \right] \times \left[ \int_0^{T_{INT}} W(t) \times I(t) dt \right] +$$

$$\left[ \int_0^{T_{INT}} PRN_{Local}(t) \times Q(t) dt \right] \times \left[ \int_0^{T_{INT}} W(t) \times Q(t) dt \right]$$

In the following section typical methods of implementations of these operations are described.

DESCRIPTION OF TYPICAL IMPLEMENTATION METHODS OF THE W-DISCRIMINATOR

The operations of the W-discriminator can be performed in an analog fashion, as indicated in the integrals in the equations described above. Alternatively, they can be performed in a digital fashion as would be required by a sampled data system, where the above equations are performed by summations instead of integration. In the following discussion these operations are performed in the digital fashion, even though the receiver will have radio frequency (RF) and intermediate frequency (IF) sections which will be completely analog with the exception of the analog-to-digital converter (A/D) which transforms the inphase and quadrature signals of the incoming satellite signal to digital samples with multiple bit resolution. In this description the W-discriminator operations are operated on the A/D output samples. However, its operation can also be performed directly on the inphase and quadrature video outputs in the analog fashion.

Figure 12:
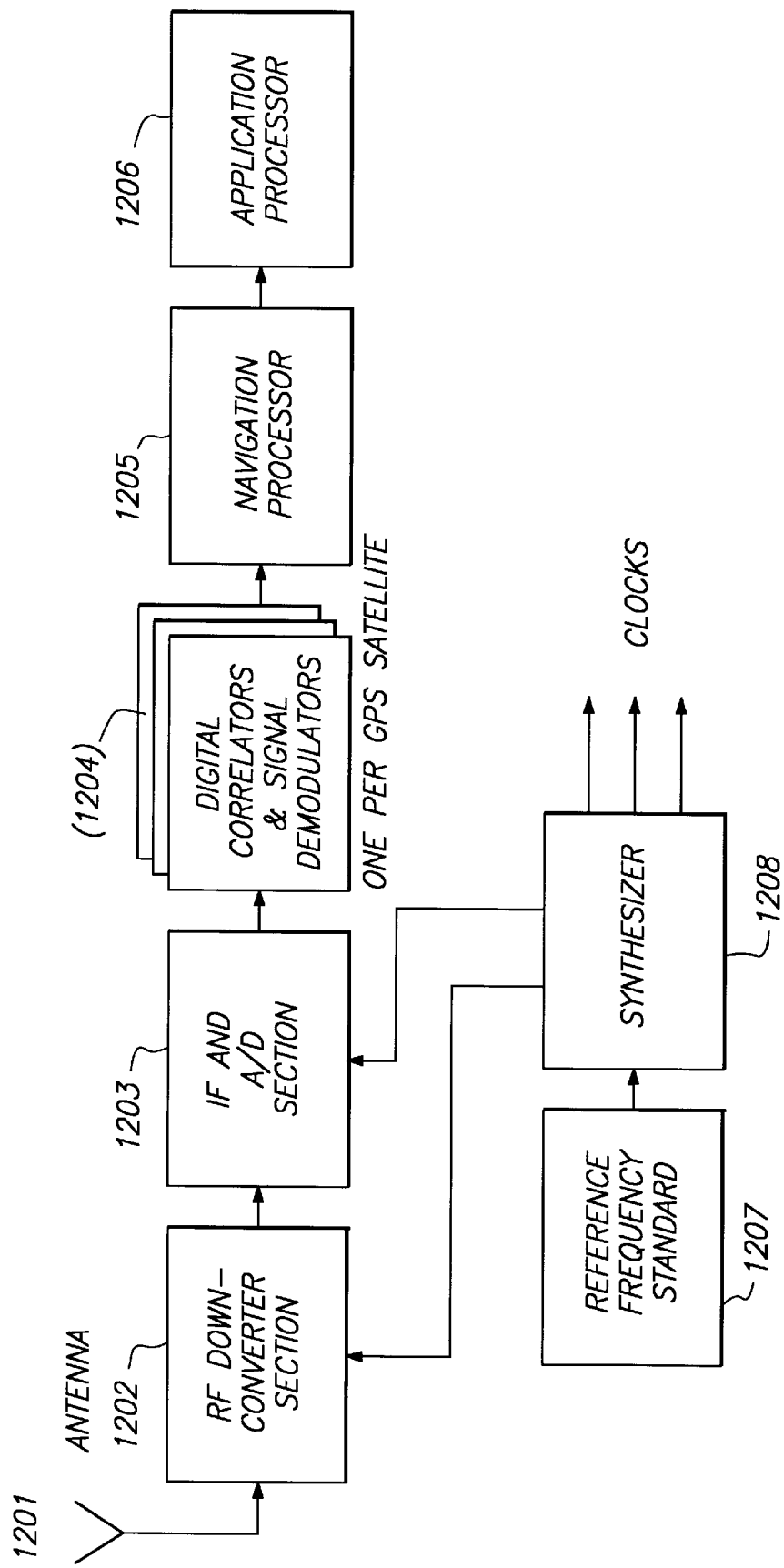
FIG. 12 illustrates the functional blocks of a GPS receiver incorporating the W-discriminator for multipath rejection.

A block diagram of the overall receiver system that applies the W-discriminator technique for multipath rejection processing of PRN coded ranging signals is given in FIG. 12. It includes an antenna (1201), a downconverter (1202), an IF and A/D section (1203), digital correlator and signal demodulators (1204), a navigation processor (1205), a specific application processor (1206), a reference frequency standard (1207), and a frequency synthesizer (1208). The block diagram in FIG. 12 will be described herein as operating within the United States Global Positioning System (GPS) using the commercial, coarse acquisition (C/A) pseudorandom codes, but it is possible to adapt the system to P-code tracking as well as to other PRN ranging systems.

Figure 13:
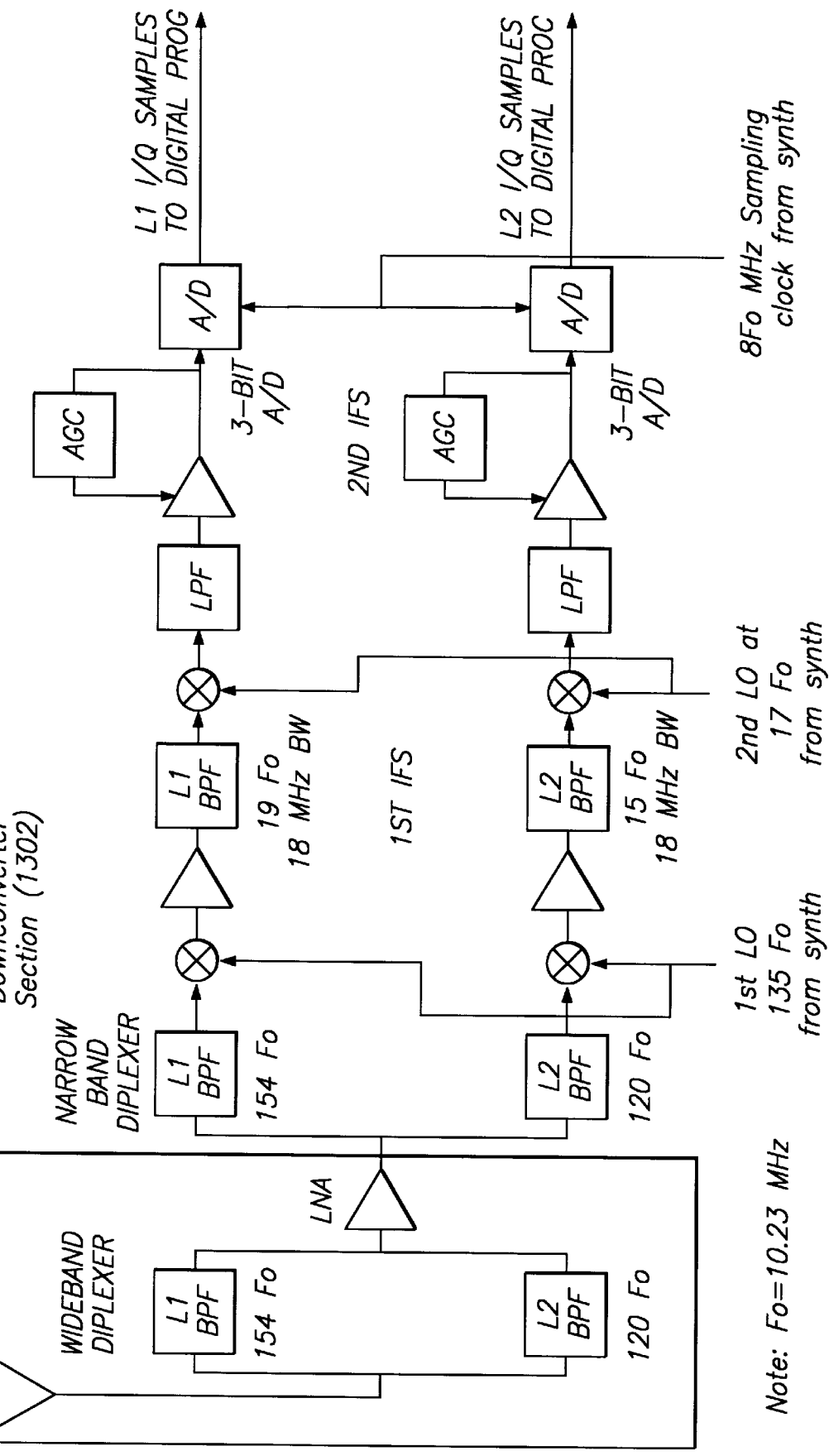
FIG. 13 illustrates the RF/IF down-conversion and A/D conversion sections of a GPS receiver incorporating the W-discriminator for multipath rejection.

A typical antenna unit, and a typical RF/IF and A/D section for a dual frequency GPS receiver which receives on both the L1 (1575.42 GHz) and L2 (1227.6 GHz) GPS signals is illustrated in further detail in FIG. 13. The antenna subsystem (1301) receives both L1 and L2 signals from all GPS satellites in view, filters the L1 and L2 signals individually, provides a low-noise amplification of both signals, and delivers these signals to the down-converter section (1302), which may be several feet to tens of feet away from the antenna subsystem (1301). The low noise amplifier (LNA) provides noise figure control and the necessary gain to overcome the loss of the cable connecting the antenna subsystem and the downconverter. The LNA typically has a noise figure around 1.0 to 1.2 dB and the gain about 25 dB. In this typical design of the downconverter (1302) the first local oscillator (LO) frequency is selected to be 135×Fo, where Fo is very close to 10.23 MHz (an offset may be necessary for the implementation of a incremental phase detector which is a commonly used technique to reduce resolution error in pseudorange tracking). The received L1 and L2 frequencies at 154×Fo and 120×Fo, respectively, are down-converted to the first IF frequencies of 19×Fo and 15×Fo by the downconverter (1302) and delivered to the IF and A/D section (1303). In the IF and A/D section the 19×Fo and 15×Fo first IF signals corresponding to L1 and L2 are further downconverted to a 2×Fo second IF by a second LO frequency of 17×Fo, filtered, automatically gain adjusted, and input to two 3-bit A/Ds that sample the 2×Fo IF signals corresponding to L1 and L2 respectively at the sample rate of 8×Fo, approximately (again, an offset in Fo from exactly 10.23 MHz may be necessary for the implementation of a incremental phase detector which is a commonly used technique to reduce resolution error in pseudorange tracking). The sampling rate of 8×Fo is selected to be commensurate with the IF frequency of 2×Fo so that inphase and quadrature samples can be obtained from the same A/D at alternate sample times, as Q, –I, –Q, –I, Q, –I, –Q, –I, . . . , where Q stands for the sine channel and I stands for the cosine channel. These samples are sign adjusted and proper quadrature samples in the order of Q, I, Q, I, Q, I, Q, I are obtained and delivered to the correlator section (1204) in FIG. 12. The LO frequencies 135×Fo and 17×Fo, and the A/D sampling clock frequency of 8×Fo are all generated from the reference frequency standard (1207) with the frequency synthesizer (1208). The composite RF bandwidth of the antenna subsystem, the RF and IF sections is about 16 to 18 MHz.

Figure 14:
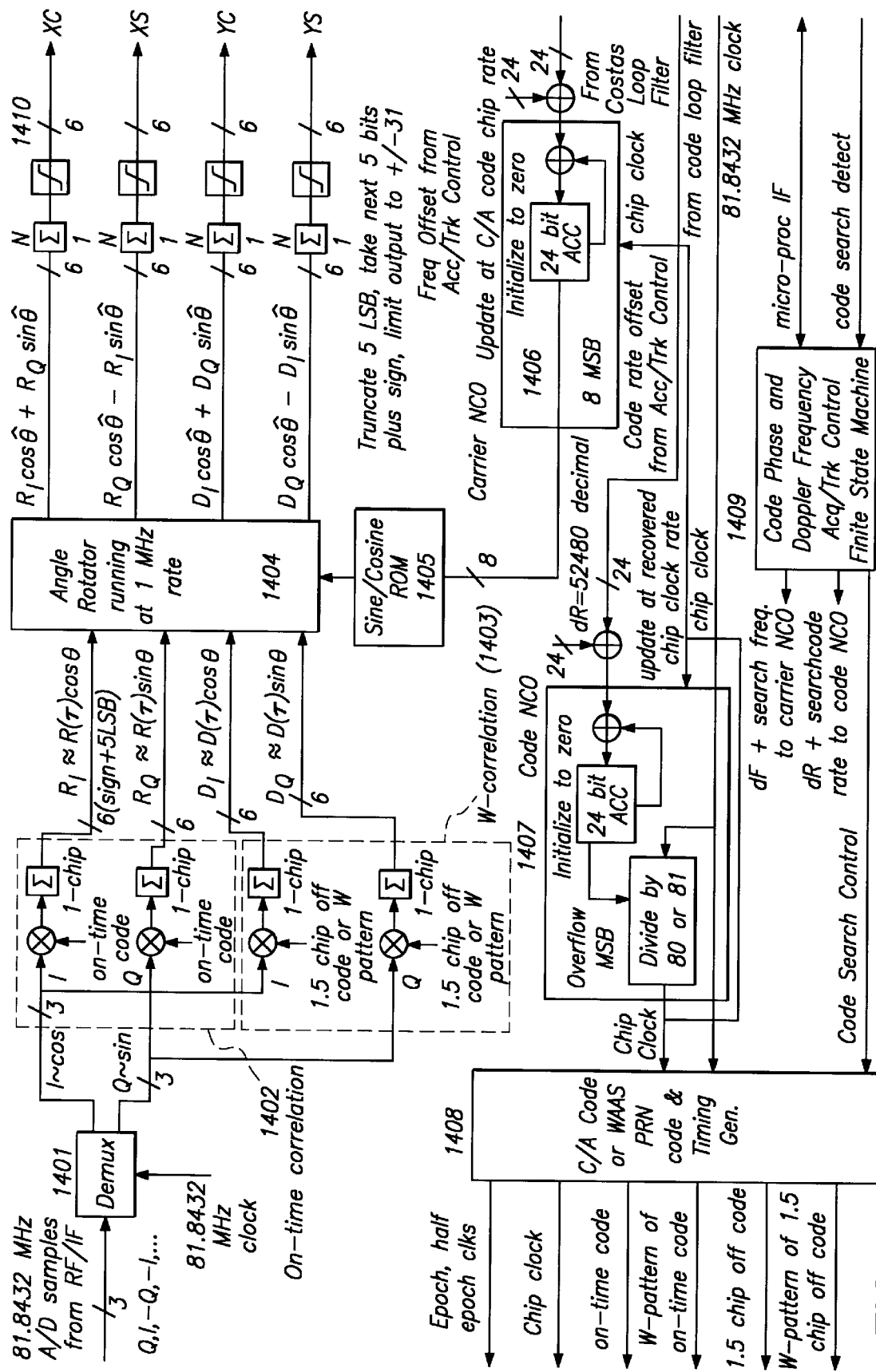
FIGS. 14, 15 and 16 illustrate the signal processing functions of code acquisition, code tracking, and carrier acquisition functions of a GPS receiver design which may take advantage of the W-discriminator for multipath rejection.
Figure 15:
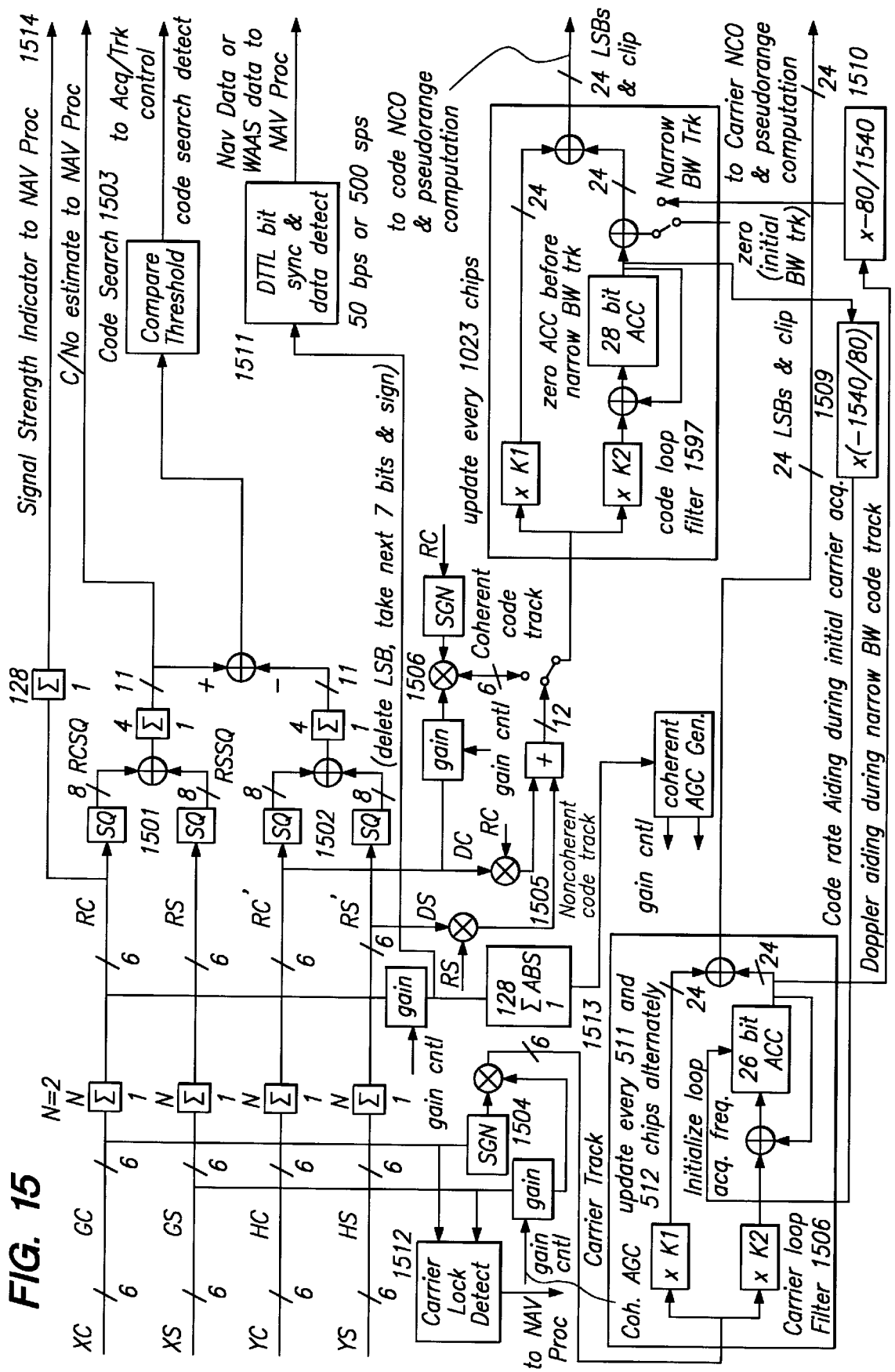
Figure 16:
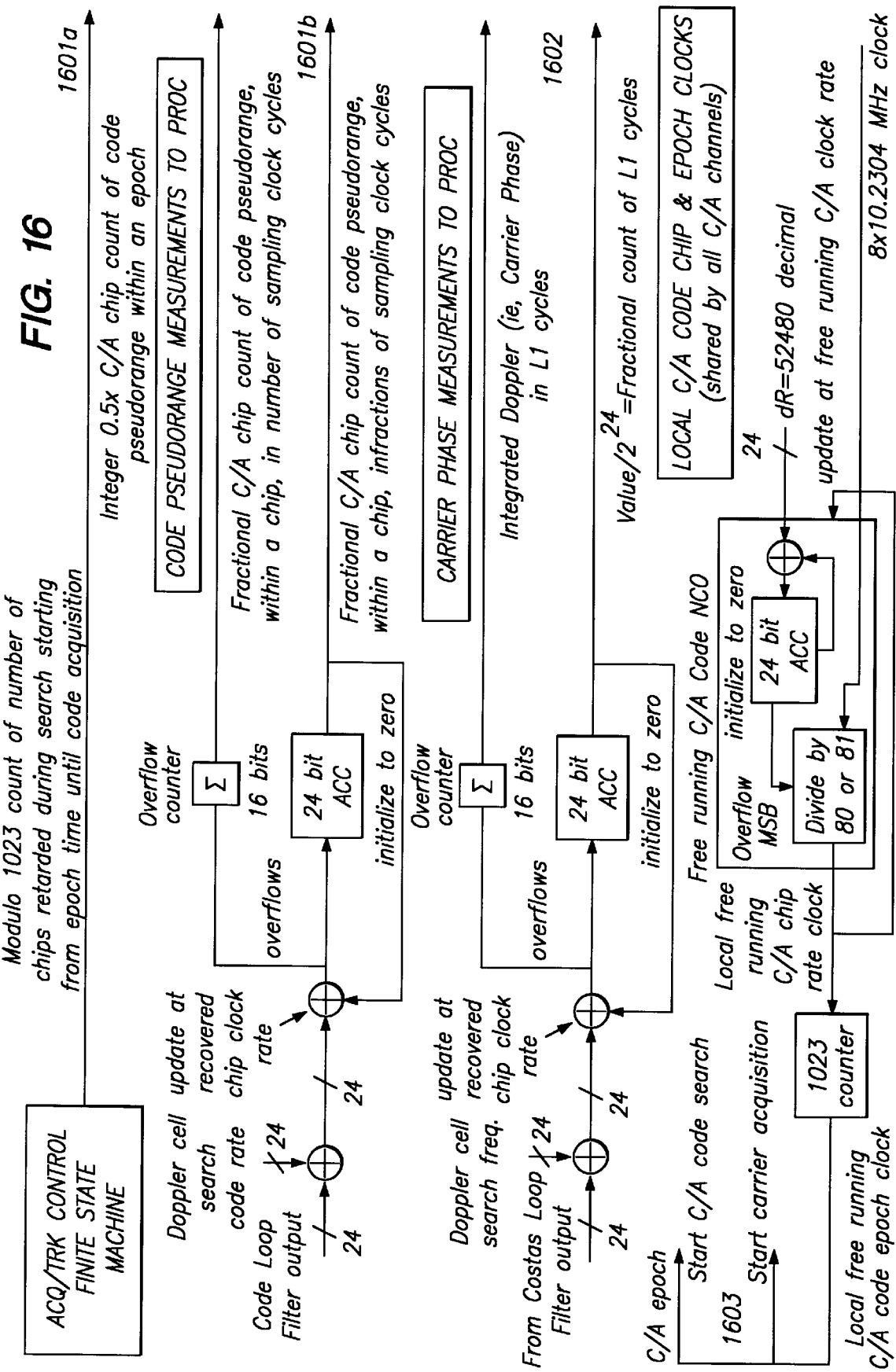
Figure 17:
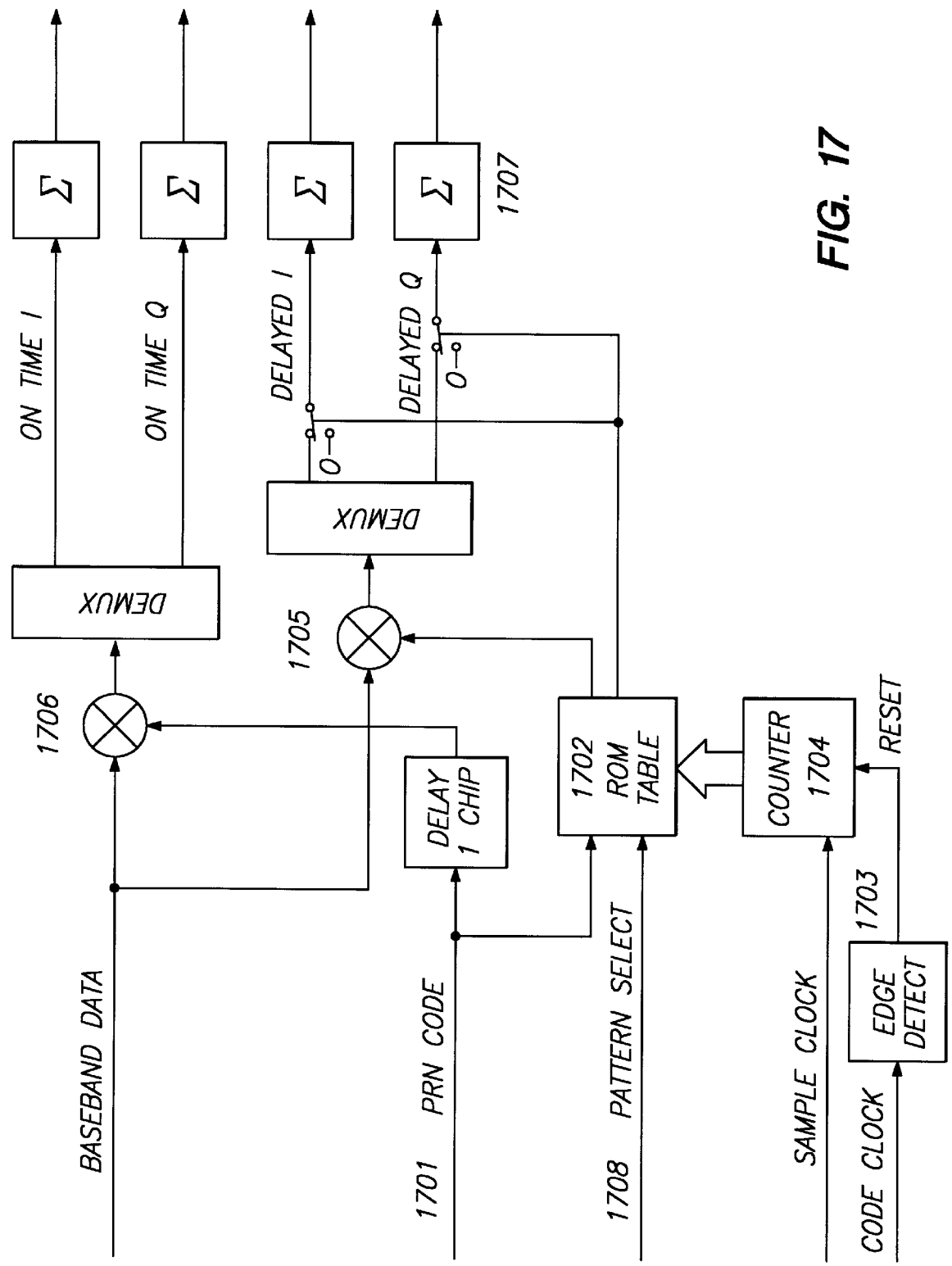
FIG. 17 illustrates the digital implementation concept of the W-discriminator processing function which provides multipath rejection during code tracking and pseudorange computation.

FIGS. 14, 15 and 16 are the block diagrams which give more details of the correlator and demodulator section (1204) that follows the IF and A/D section (1203). The high speed digital processing functions are shown in FIG. 14, and the slower speed digital processing functions are shown in FIGS. 15 and 16. Further more details of the digital design of the implementation of the W-correlator is illustrated in FIG. 17.

In FIG. 14 the main functions of on-time code correlation are shown in circuits (1402), 1.5 chip offset correlation (used in code acquisition) and W-discriminator correlation (used in code tracking in pseudorange measurements) are shown in circuits (1403), angle rotation functions for carrier phase demodulation is shown in circuits (1404, 1405), the carrier NCO circuit is shown in (1406), the code NCO circuit is shown in (1407), the code generator which generates the C/A (or P) on-time code, the 1.5 chip offset code, the W-discriminator waveforms of the on-time or 1.5 chip off codes is denoted as circuit (1408), the acquisition/tracking control finite state machine circuit is denoted as circuit (1409), and the summation circuit which is part of the correlation process in given in circuit (1410). The demultiplexor (1401) divides the A/D output data stream into I and Q samples and input to the correlator circuits (1402) and (1403).

For fast signal acquisition the code search process is performed in this design at one chip steps instead of the conventional half chip steps. This is achieved with the on-time code correlation circuit (1402), and the 1.5 chip offset correlation circuit (1403). The on-time correlation circuit (1402) correlates the incoming quadrature samples by multiplying them with the on-time code, generated by the code generator (1408), and summing the product samples over the time duration of one C/A chip. The circuit (1403) serves two purposes: it serves as the 1.5 chip offset code correlator during initial code search acquisition, and serves as the W-discriminator correlator which detects the delay error of the received PRN signal during code tracking and pseudorange computations. During initial code search the circuit (1403) correlates the incoming I and Q samples with the code which is 1.5 chips (or any integer plus 0.5 chips) offset from the on-time code, generated by the code generator circuit (1408) and labeled as 1.5 chip off code, which multiplies the incoming quadrature samples by the 1.5 chip offset code, also generated by the code generator (1408), and sum the product samples also over the time period of one C/A chip. During code search the difference between the on-time correlation value (in the squared envelope sense) and the 1.5 chip offset correlation value is used to compare with a pre-determined threshold, and determines whether the incoming PRN signal is detected or not, and whether it correlates with the on-time code or the 1.5 chips offset code.

FIG. 15 depicts these functions in circuits (1501), (1502), and (1503). Because of this implementation, the code search process can be performed serially, in one chip steps, rather than in half chip steps, which is required if only the on-time correlation circuit is implemented, as is commonly performed in more conventional designs of PRN receivers. After initial code acquisition, the circuit (1403) is switched to perform the conventional early-late correlation with one chip spacing initially, and then switched to W-discriminator correlation after initial code tracking is established. It depends on whether the signal is acquired on the on-time code or on the 1.5 chip offset code, the incoming I, Q samples are correlated with the on-time early-late code or the on-time W-discriminator waveform, or with the 1.5 chip offset early-late code or the 1.5 chip offset W-discriminator waveform. The received I, Q samples are multiplied with the on-time early-late code or the on-time W-discriminator waveform, or with the 1.5 chip offset early-late code or the 1.5 chip offset W-discriminator waveform, and the product samples are summed over the time interval of one C/A chip in this process. Either during code acquisition, or during code tracking, the outputs of the correlator circuits (1402) and (1403) are input to the angle rotator circuit (1404) which performs the function of carrier frequency (and phase) demodulation using the local carrier phase developed by the carrier NCO circuit (1406) and with ROM (read-only-memory) look up tables to perform the process of angle rotation functions which are described by the transform equations in FIG. 14, following the block showing the angle rotator (1404). The code generator timing is controlled by the 8×Fo clock during initial acquisition, and is controlled by the recovered code chip clock derived from the code NCO circuit (1407) during tracking. The mode control of acquisition and tracking is performed by the finite state machine denoted by circuit (1409).

In addition to the acquisition threshold comparison circuits (1501), (1502), and (1503), FIG. 15 shows other functions of the receiver. These functions are described below.

1) Non-coherent code delay error generation (1505) using either the 1-chip early-late correlation outputs or the W-discriminator correlation outputs developed in (1403); this operation is used in initial code tracking before carrier phase is recovered as indicated by the carrier lock indicator circuit (1512), and performs the noncoherent mode W-discriminator (or early-late discriminator) equations of operations described in the preferred embodiment.

2) Coherent code delay error generation (1506) using either the 1-chip early-late correlation outputs or the W-discriminator correlation outputs developed in (1403); this operation is used in the coherent code tracking after carrier phase is recovered as indicated by the carrier lock indicator circuit (1512), and performs the coherent mode W-discriminator (or early-late discriminator) equations of operations described in the preferred embodiment.

3) Costas loop carrier phase error detection circuit (1504), which generates the carrier phase error estimate by multiplying the Q-channel code correlation with the sign of the I-channel code correlation.

4) The carrier lock indicator circuit (1512) which indicates carrier lock by providing a signal that is proportional to $I^2-Q^2$.

5) The coherent AGC circuits (1513), which properly adjusts the signals amplitude after carrier recovery in order to provide accurate loop gain and bandwidth controls.

6) The code tracking loop filter circuit (1507), which is a second order loop filter with a proportional and an integral term to provide proper Doppler tracking. The output of this circuit is input to the code NCO (1407) shown in FIG. 14 and the code pseudorange computation circuit (1601) shown in FIG. 16. The essential advantage of the W-discriminator is that the code loop filter output signal from (1507), derived from the W-discriminator correlation circuit (1403), would be almost free of multipath errors, and consequently the pseudorange computed from (1601) is free of multipath errors.

7) The carrier tracking loop filter circuit (1508) which is also shown as a second order loop filter with a proportional and an integral term to provide proper Doppler tracking. This is not necessary for all receiver design, and a third order loop filter can also be applied. The output of this circuit is input to the carrier NCO (1406) shown in FIG. 14 and the carrier phase pseudorange computation circuit (1602) shown in FIG. 16.

8) The carrier aiding circuit (1510) which removes the code rate Doppler by estimating the carrier Doppler and scaling it to remove the code rate Doppler, which is implemented to allow narrow loop bandwidth code tracking to reduce code noise.

9) The code rate aiding for initial carrier acquisition circuit (1509) which gives an initial estimate of the carrier Doppler by scaling from the code rate Doppler in the loop filter accumulator of the noncoherent code loop.

10) The data transition tracking loop (DTTL) bit synchronizer and bit detection circuit (1511) which detects the GPS navigation message after code and carrier tracking have been established. The output of the detected navigation bits are input to the navigation processor (1205) in FIG. 12 for navigation solution computations.

11) The signal strength indicator circuit (1514), which also delivers its output signal to the navigation processor (1205).

Code and carrier phase pseudorange computation circuits are illustrated in FIG. 16. A local time base (1603), which will be steered to GPS time after the acquisition of one or more GPS satellites, is used to derive a local C/A code epoch. All satellite code searches will begin on the epoch time; start all C/A code searches on epoch time with known code states (all 1s), and start all carrier acquisitions on epoch time with carrier NCO at zero. The code pseudorange is computed in two parts: one in multiples of half chips, which indicates the received code phase within a local epoch, to the resolution of half chips. This is computed in circuit (1601a). Circuit (1601b) computes the fractional chip pseudorange down to $1/(80 \times 2^{24})$ of a chip with the 8×Fo sampling clock frequency and the 24 bit code NCO accumulator used in this example design. Carrier phase pseudorange is computed with circuit (1602). Carrier phase pseudorange is computed in units of multiple of carrier cycles, and in units of fractional carrier cycles, down to $\frac{1}{2}^{24}$ of a carrier cycle with the 24 bit carrier NCO accumulator used in this example design. Choices of the number of bits in the NCOs are not fixed, and may change depends on the expected accuracy and the dynamic environment.

FIG. 17 further illustrates the detailed digital design which can be used to accomplish the correlation function of the incoming I and Q samples with the W-discriminator which is performed by circuit (1403) of FIG. 14. The PRN code (1701, either on-time or 1.5 chip offset, as shown in FIG. 14) from the C/A code generator in circuit (1408) is input to address a ROM table (1702), which stores the W-discriminator waveforms (either W1, W2, or W3) for different code polarity transition conditions: i) a negative to positive transition between the two adjacent chips; ii) a positive to negative transition between the two adjacent chips; iii) both adjacent chips are positive and there is no transition; and iv) both adjacent chips are negative and there is no transition. The proper W-discriminator waveform (as illustrated in FIGS. 6, 8, 10, and 11) is selected from the ROM table according to the local PRN code polarity transition and the pattern select command (1708) for W1, W2, or W3 selections. The sample counter circuit counts the sample clock to determines the sampling of the ROM table (1702) in the W-discriminator waveform generation and gate-width control. The edge detect circuit (1703) detects the edge of the local code clock and resets the counter (1704) to allow proper generation of the W-discriminator waveform pattern for the pair of adjacent chips which follows the current pair. The baseband I, Q samples are multiplied with the W-discriminator waveform pattern generated from the ROM table (1702), and summed over the correlation period (e.g., one C/A chip time) by circuit (1707). This performs the W-discriminator correlation process described in equations (2) and (4) given in the preferred embodiment under the respective sections describing the equations of operations of the coherent and noncoherent mode W-discriminator processing. The local PRN code (1701) is delayed one chip and used to multiply the I, Q samples of the incoming PRN signal by the correlation circuit (1706), the product samples are summed over the desired integration period (e.g., one C/A chip). This performs the W-discriminator correlation process described in equations (1) and (3) given in the preferred embodiment under the respective sections describing the equations of operations of the coherent and noncoherent mode W-discriminator processing. The PRN code signal used to select the W-discriminator waveform pattern from the ROM table is one chip advanced with respect to the on-time code because the ROM table requires the information of the current chip and the following chip to determine the polarity condition of each pair of adjacent chips in order to select the proper W-discriminator pattern.

PERFORMANCE OF W-DISCRIMINATOR

Figure 18:
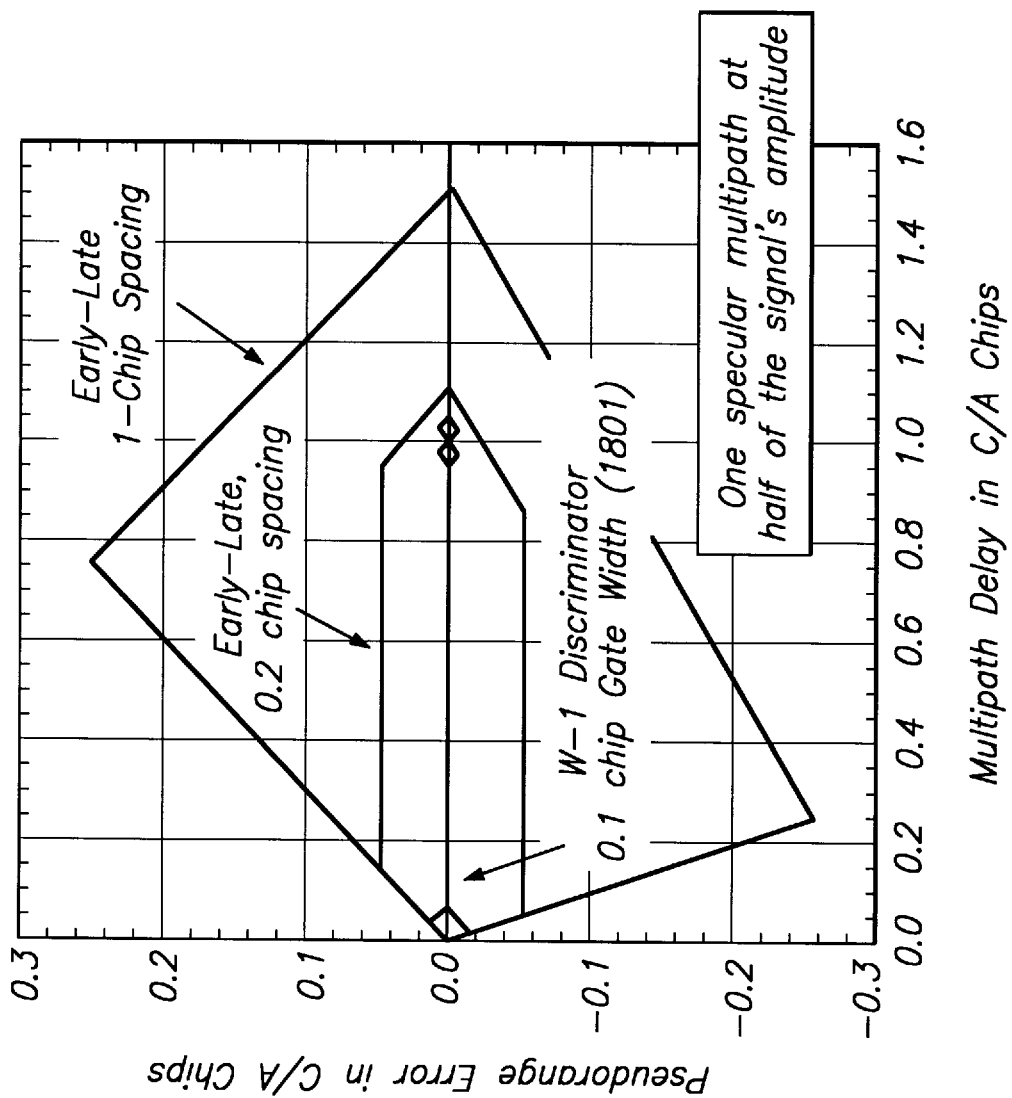
FIG. 18 is a plot of the error envelopes of the W1-discriminator as compared to the conventional early minus late (E-L) discriminators with 1-chip spacing and the narrow spacing correlator with 0.2-chip spacings, when there is a specular multipath present which has an amplitude equal to half of the signal's amplitude. This figure illustrates the distinct advantage of the W1-discriminator over the E-L and narrow spacing correlators. In this plot the W1-discriminator has a gate width of 0.1 chips, which is achievable with current CMOS digital technology for C/A code tracking at the C/A code chip rate of 1 MHz (e.g., A/D sampling at 40 MHz and using 4 A/D samples across the gate width of the W1-discriminator).
Figure 19:
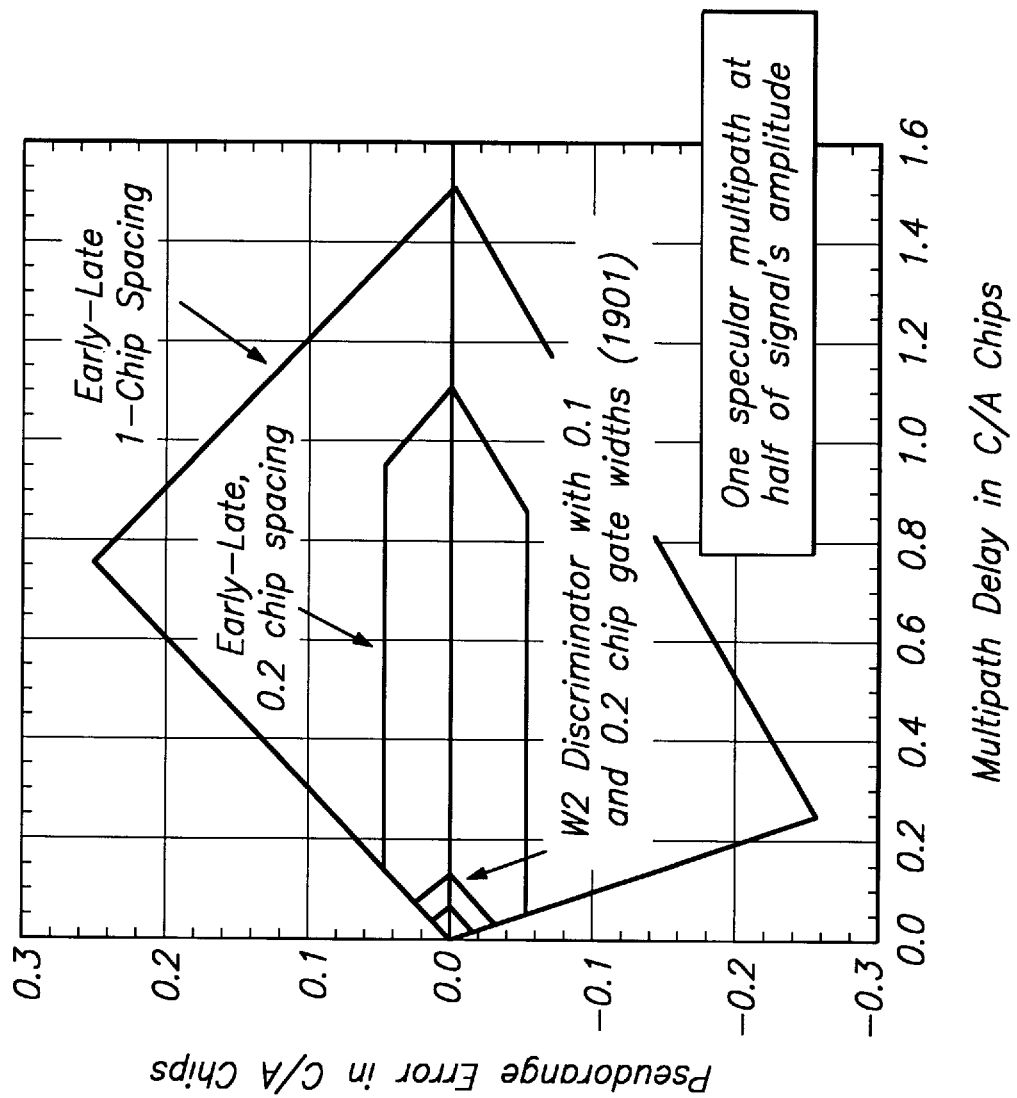
FIG. 19 is a plot of the error envelopes of the W2-discriminator as compared to the conventional early minus late (E-L) discriminators with 1-chip spacing and the narrow spacing correlator with 0.2-chip spacings, when there is a specular multipath present which has an amplitude equal to half of the signal's amplitude. This figure illustrates the distinct advantage of the W2-discriminator over the E-L and narrow spacing correlators and also shows that the W2-discriminator gives better multipath rejection performance than the W1-discriminator though its noise performance is not as good as the W1-discriminator. In this plot the W2-discriminator has a gate width of 0.1 chips, which is achievable with current CMOS digital technology for C/A code tracking at the C/A code chip rate of 1 MHz (e.g., A/D sampling at 40 MHz and using 4 A/D samples across the gate width of the W2-discriminator).

The expected performance of the W1 and W2-discriminator in the presence of a specular multipath at half of the amplitude of the desired signal and over various delays with respect to the desired signal are shown in the error envelopes (1801) and (1901) of FIGS. 18 and 19. The W-discriminator (W1 and W2) have a gate-width (or span, as described interchangeably in earlier sections) of 0.1 C/A chips. The upper portions of the error envelops correspond to the case in which the carrier phase of the multipath is aligned with the carrier phase of the desired signal. The lower portions of the error envelops correspond to the case in which the carrier phase of the multipath is 180 degrees out-of-phase with the carrier phase of the desired signal. These error envelopes are compared to that of the conventional 1-chip spacing early-late correlator and the narrow spacing correlator with 0.2 chip correlator spacing. Both W1 and W2 shows significantly improved performance over the 1-chip spacing early-late correlator and the narrow spacing correlator with 0.2 chip correlator spacing. As mentioned earlier, W2 is better than W1 in multipath rejection yet it is inferior to W1 in performance with respect to receiver noise. The W3-discriminator, formed as a linear (or nonlinear) combination can potentially provide a compromise solution which results in enhanced performance in terms of both multipath and noise rejection. For C/A code reception a W-discriminator (W1, W2, or W3) waveform pattern can be consisted of four A/D samples. This indicates that a 0.1 chip gate-width W-discriminator can be constructed for C/A code processing with an A/D sampling rate of 40 MHz for either the inphase or quadrature channels (i.e., with a 80 MHz A/D if quadrature sampling used).

Figure 20:
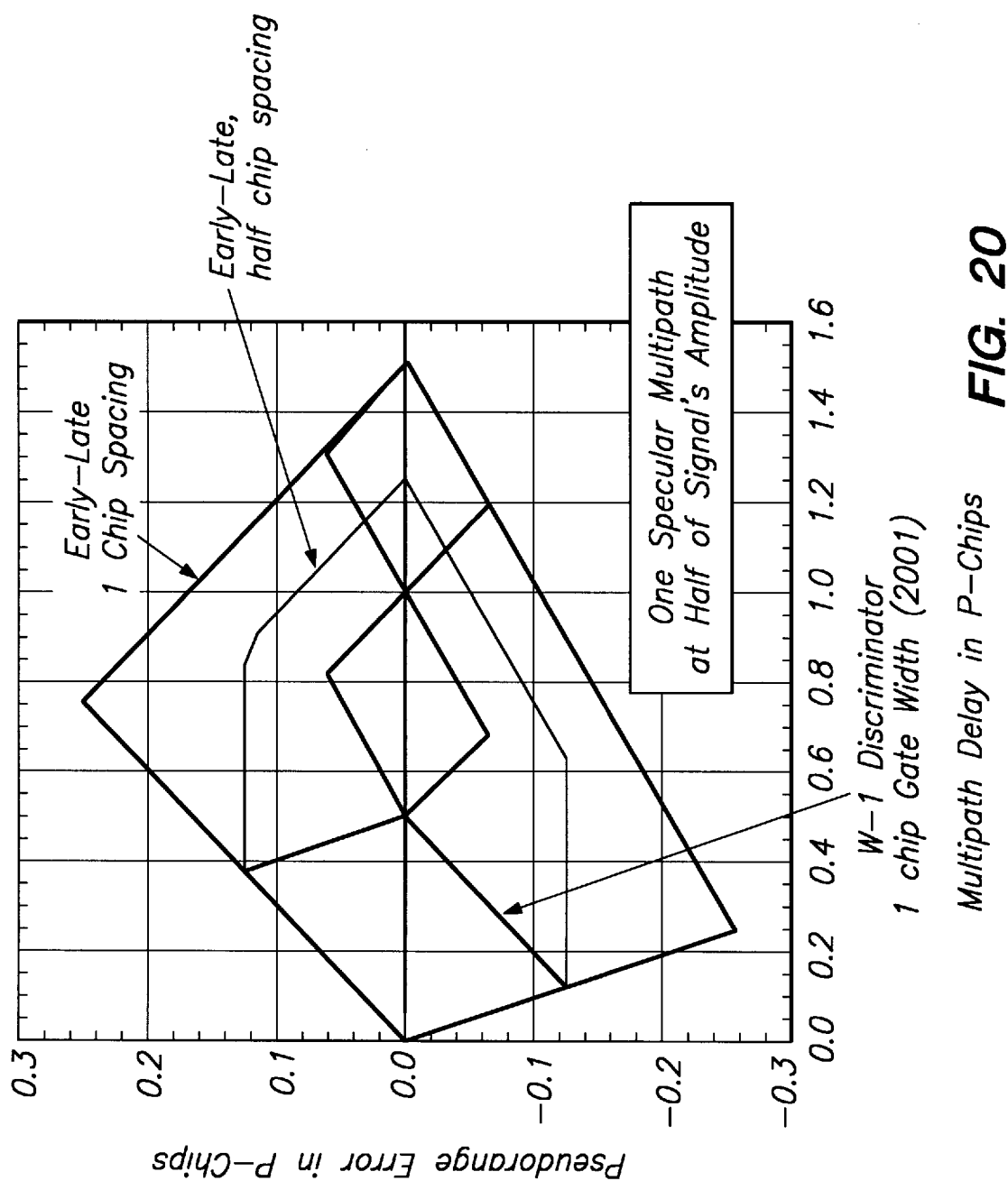
FIG. 20 is a plot of the error envelopes of the W1-discriminator as compared to the conventional early minus late (E-L) discriminators with 1-chip spacing and the narrow spacing correlator with 0.5-chip spacings, when there is a specular multipath present which has an amplitude equal to half of the signal's amplitude. In this plot the W1-discriminator has a gate width of 1 chip, which is achievable with current CMOS digital technology for P code tracking at the P code chip rate of 10 MHz (e.g., A/D sampling at 40 MHz and using 4 A/D samples across the gate width of the W1-discriminator).
Figure 21:
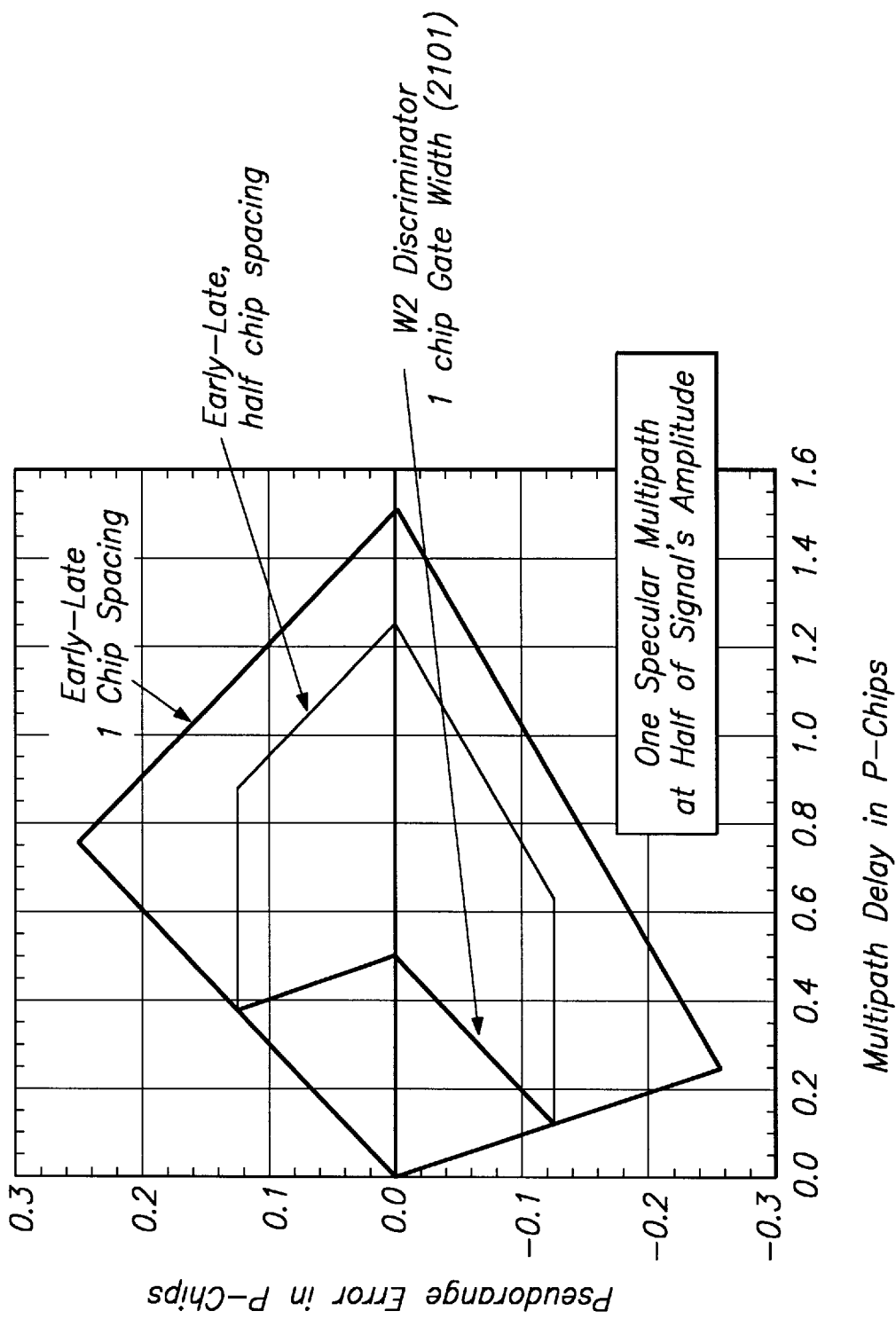
FIG. 21 is a plot of the error envelopes of the W2-discriminator as compared to the conventional early minus late (E-L) discriminators with 1-chip spacing and the narrow spacing correlator with 0.5-chip spacings, when there is a specular multipath present which has an amplitude equal to 50% of the signal's amplitude. In this plot the W2-discriminator has a gate width of 1 chip, which is achievable with current CMOS digital technology for P code tracking at the P code chip rate of 10 MHz (e.g., A/D sampling at 40 MHz and using 4 A/D samples across the gate width of the W2-discriminator).

The gate-width of the W-discriminator will need to wider for P-code processing if the same A/D sampling rate of 80 MHz is used, since the P-code has a chip rate which is ten times higher than that of the C/A code. For the 80 MHz sampling rate and requiring at least four A/D samples for the span of the W-discriminator waveform pattern, the minimum gate width would necessarily be 1 P-chip. The performance of the W1 and W2-discriminator in the presence of a specular multipath at half of the amplitude of the desired signal and over various delays with respect to the desired signal are shown in the error envelopes (2001) and (2101) of FIGS. 20 and 21. Again, the upper portions of the error envelops correspond to the case in which the carrier phase of the multipath is aligned with the carrier phase of the desired signal. The lower portions of the error envelops correspond to the case in which the carrier phase of the multipath is 180 degrees out-of-phase with the carrier phase of the desired signal. These error envelopes are compared to that of the conventional 1-chip spacing early-late correlator and the narrow spacing correlator with 0.5 chip correlator spacing. Both W1 and W2 shows significantly improved performance over the 1-chip spacing early-late correlator. W1 shows some improvement over the narrow spacing correlator with 0.5 chip correlator spacing, while W2 shows definite improvement over the narrow spacing correlator with 0.5 chip correlator spacing.

CONCLUSION

Advantages of the invention include improved multipath signal rejection.

Having disclosed exemplary embodiments and the best mode, modifications and variations may be made to the exemplary embodiments while remaining within the scope of the invention as defined by the following claims.

What is claimed is:

1. A global positioning system receiver comprising:
   an inbound signal terminal to receive an inbound global positioning system signal having an inbound PRN code from a global positing system signal source, said inbound PRN code having a plurality of transitions;
   a local PRN code generator configured to generate a local PRN code;
   a discriminator coupled to said inbound signal terminal and to said local PRN code generator and configured to compare said inbound signal and said local PRN code and to generate a discriminator signal containing a positive portion and a negative portion for each of said transitions in said inbound PRN code; and
   a processor coupled to said discriminator and configured to receive said discriminator signal and to process said discriminator signal to determine a phase delay parameter associated with said global positing system signal.

2. The global positioning system receiver of claim 1, wherein:
   said discriminator generates said discriminator signal on a transition of said inbound PRN code.

3. The global positioning system receiver of claim 1, wherein:
   said discriminator generates said discriminator signal on a transition of said inbound PRN code, wherein said discriminator signal has a first set of values for a positive to negative transition, and a second set of values opposite in polarity to said first set for a negative to positive transition.

4. The global positioning system receiver of claim 1, wherein:
   said discriminator generates said discriminator signal between chips of said inbound PRN code.

5. The global positioning system receiver of claim 1, wherein:
   said discriminator generates said discriminator signal between chips of said inbound PRN code, wherein said discriminator signal has a first set of values for a positive to negative transition, a second set of values opposite in polarity to said first set for a negative to positive transition, and a third set of values for no transition.

6. The global positioning system receiver of claim 1, wherein:
   said discriminator generates said discriminator signal between chips of said inbound PRN code, wherein said discriminator signal has a first set of values for a positive to negative transition, a second set of values opposite in polarity to said first set for a negative to positive transition, and a third set of values having half the magnitudes of said first set and said second set for no transition.

7. The global positioning system receiver of claim 3, wherein:
   said discriminator signal has an acquisition mode configured to acquire said inbound PRN code wherein said discriminator has a first gate width and a tracking mode configured to track said PRN code wherein said discriminator has a second gate width less than said first gate width.

8. The global positioning system receiver of claim 5, wherein:

said discriminator signal has an acquisition mode configured to acquire said inbound PRN code wherein said discriminator has a first gate width and a tracking mode configured to track said PRN code wherein said discriminator has a second gate width less than said first gate width.

9. The global positioning system receiver of claim 6, wherein:

said discriminator signal has an acquisition mode configured to acquire said inbound PRN code wherein said discriminator has a first gate width and a tracking mode configured to track said PRN code wherein said discriminator has a second gate width less than said first gate width.

10. A method of receiving a global positioning system signal comprising the steps of:

receiving an inbound global positioning system signal having an inbound PRN code from a global positing system signal source, said inbound PRN code having a plurality of transitions;

generating a local PRN code;

comparing said inbound signal and said local PRN code and generating a discriminator signal containing a positive portion and a negative portion for each of said transitions in said inbound PRN code;

processing said discriminator signal; and determining a phase delay parameter associated with said global positioning system signal.

11. The method of claim 10, wherein:

said comparing and generating step includes the step of generating said discriminator signal on a transition of said inbound PRN code.

12. The method of claim 10, wherein:

said comparing and generating step includes the step of generating said discriminator signal on a transition of said inbound PRN code, wherein said discriminator signal has a first set of values for a positive to negative transition, and a second set of values opposite in polarity to said first set for a negative to positive transition.

13. The method of claim 10, wherein:

said comparing and generating step includes the step of generating said discriminator signal between chips of said inbound PRN code.

14. The method of claim 10, wherein:

said comparing and generating step includes the step of generating said discriminator signal between chips of said inbound PRN code, wherein said discriminator signal has a first set of values for a positive to negative transition, a second set of values opposite in polarity to said first set for a negative to positive transition, and a third set of values for no transition.

15. The method of claim 10, wherein:

said comparing and generating step includes the step of generating said discriminator signal between chips of said inbound PRN code, wherein said discriminator signal has a first set of values for a positive to negative transition, a second set of values opposite in polarity to said first set for a negative to positive transition, and a third set of values having half the magnitudes of said first set and said second set for no transition.

16. The method of claim 12, wherein:

said comparing and generating step includes the step of generating said discriminator signal in an acquisition mode to acquire said inbound PRN code wherein said discriminator has a first gate width and a tracking mode configured to track said PRN code wherein said discriminator has a second gate width less than said first gate width.

17. The method of claim 14, wherein:

said comparing and generating step includes the step of generating said discriminator signal in an acquisition mode configured to acquire said inbound PRN code wherein said discriminator has a first gate width and a tracking mode configured to track said PRN code wherein said discriminator has a second gate width less than said first gate width.

18. The method of claim 15, wherein:

said comparing and generating step includes the step of generating said discriminator signal in an acquisition mode configured to acquire said inbound PRN code wherein said discriminator has a first gate width and a tracking mode configured to track said PRN code wherein said discriminator has a second gate width less than said first gate width.

* * * * *